US012794267B2

(12) United States Patent
Ben-Dov et al.

(10) Patent No.: US 12,794,267 B2
(45) Date of Patent: Nov. 10, 2026

(54) ELECTROMAGNETIC POWERED POOL CLEANING ROBOT

(71) Applicant: Maytronics Ltd., Kibutz Yizrael (IL)

(72) Inventors: Boaz Ben-Dov, Kibbutz Yizrael (IL); Netanel Spector, Kibbutz Regavim (IL); Shachar Armon, Kibbutz Regavim (IL); Yair Hadari, Kibbutz Hulata (IL)

(73) Assignee: Maytronics Ltd., Kibutz Yizrael (IL)

( * ) Notice: Subject to any disclaimer, the term of this patent is extended or adjusted under 35 U.S.C. 154(b) by 10 days.

(21) Appl. No.: 18/866,550

(22) PCT Filed: May 16, 2023

(86) PCT No.: PCT/IB2023/055000
§ 371 (c)(1),
(2) Date: Nov. 17, 2024

(87) PCT Pub. No.: WO2023/223187
PCT Pub. Date: Nov. 23, 2023

(65) Prior Publication Data

US 2025/0309686 A1 Oct. 2, 2025

(30) Foreign Application Priority Data

May 16, 2022 (IL) .......................................... 293037

(51) Int. Cl.
*H02J 50/10* (2016.01)
*E04H 4/16* (2006.01)
*H02J 50/00* (2016.01)
*H02J 50/80* (2016.01)

(52) U.S. Cl.
CPC ............ *H02J 50/10* (2016.02); *E04H 4/1654* (2013.01); *H02J 50/005* (2020.01); *H02J 50/80* (2016.02)

(58) Field of Classification Search
CPC .......... H02J 50/005; H02J 50/10; H02J 50/80; E04H 4/1654
USPC .......................................................... 307/104
See application file for complete search history.

(56) References Cited

U.S. PATENT DOCUMENTS 9,614,378 B2 4/2017 Golko et al.
10,873,214 B2 12/2020 Ueta et al.
2012/0235636 A1 9/2012 Partovi
2014/0252876 A1 9/2014 Riezebos
2018/0054081 A1 2/2018 Hwang et al.
2019/0284827 A1 9/2019 Witelson et al.
(Continued)

FOREIGN PATENT DOCUMENTS

CN 106602630 A 4/2017
CN 111322563 A 6/2020
(Continued)

OTHER PUBLICATIONS

Powermat. "Ensuring safety in wireless charging systems", The Powermat Blog, (Jul. 25, 2018). [retrieved on Sep. 21, 2022]. Retrieved from the Internetat URL: <https://web.archive.org/web/20220630113733/https://powermat.com/blog/ensuring-safety-in-wireless-charging-systems>.

*Primary Examiner* — Hal Kaplan
(74) *Attorney, Agent, or Firm* — Reches Patents

(57) ABSTRACT

A pool related platform that may include one or more power consuming elements; and a wireless power transfer interface module that comprises a ferromagnetic element that is located within a housing, the housing comprises a first housing part and a second housing part, the second housing part is secured to the first housing part.

20 Claims, 24 Drawing Sheets

(56) References Cited

U.S. PATENT DOCUMENTS

| | | | |
|---|---|---|---|
| 2021/0215309 | A1 | 7/2021 | Tsao et al. |
| 2021/0242718 | A1 | 8/2021 | Potucek et al. |
| 2021/0317675 | A1 | 10/2021 | Witelson et al. |

FOREIGN PATENT DOCUMENTS

| | | | |
|---|---|---|---|
| CN | 112968534 | A | 6/2021 |
| IL | 150848 | A | 6/2008 |

ELECTROMAGNETIC POWERED POOL CLEANING ROBOT

FIELD OF INVENTION

The present invention relates to systems and methods for providing submerged and non-submerged electromagnetic connections (EMC) to power electrical cable or cord to supply power to tethered pool cleaning robots operating in a swimming pool.

BACKGROUND

It is well known that pool cleaning robots or pool robots are usually connected and powered by means of electrical cables that receive their power from external electrical power supplies that are located on the pool deck or at some distance from the pool's edge. Such cables may at times reach a length of up to 50 meters or more. For practical reasons, there is a growing need to reduce human effort in cleaning pools. For aesthetical reasons, there is also growing need to use non-cabled pool robots that may be battery operated. Other solutions propose electrical cables or cords that are hidden or tucked away from sight but that yet are still tethered to power pool cleaning robots.

In response to such market demand, developments have concentrated solutions such as on-board battery powered pool cleaner robots that can have their batteries charged. Another area of development calls for a continued use of a said electrical cable but in such a manner where the cable is hidden or concealed from the eye.

Various electrically powered products are used while submerged inside swimming pools, water tanks or spa environments and as a rule, they need to be tethered to an electrical power supply source to be able to function. For example: counter current swimming equipment, pool lifts, spot lamps, alarms, pumps, pool cleaning robots and more.

One way of achieving this is to employ an underwater contactless EMC power supply connections, such as an inductive electrical supply powering system that may be fully submerged underwater or alternatively, located externally, in the wet or humid vicinity of a pool's edge.

The simplest solution is to locate a mechanical galvanic electric power connector at the pool wall, however, for electrical safety reasons a connector of this kind is forbidden.

SUMMARY

There may be provided herein methods and systems for providing non-contact electromagnetic connection devices allowing power transmission for use in underwater or highly humid environments. For ease, the primary first half-core coil winding module (or sub-assemblies thereof) may be referred to hereinafter as a transmitter or a Tx; and the secondary half-core coil winding module (or sub-assemblies thereof) may be referred to as a receiver or a Rx.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
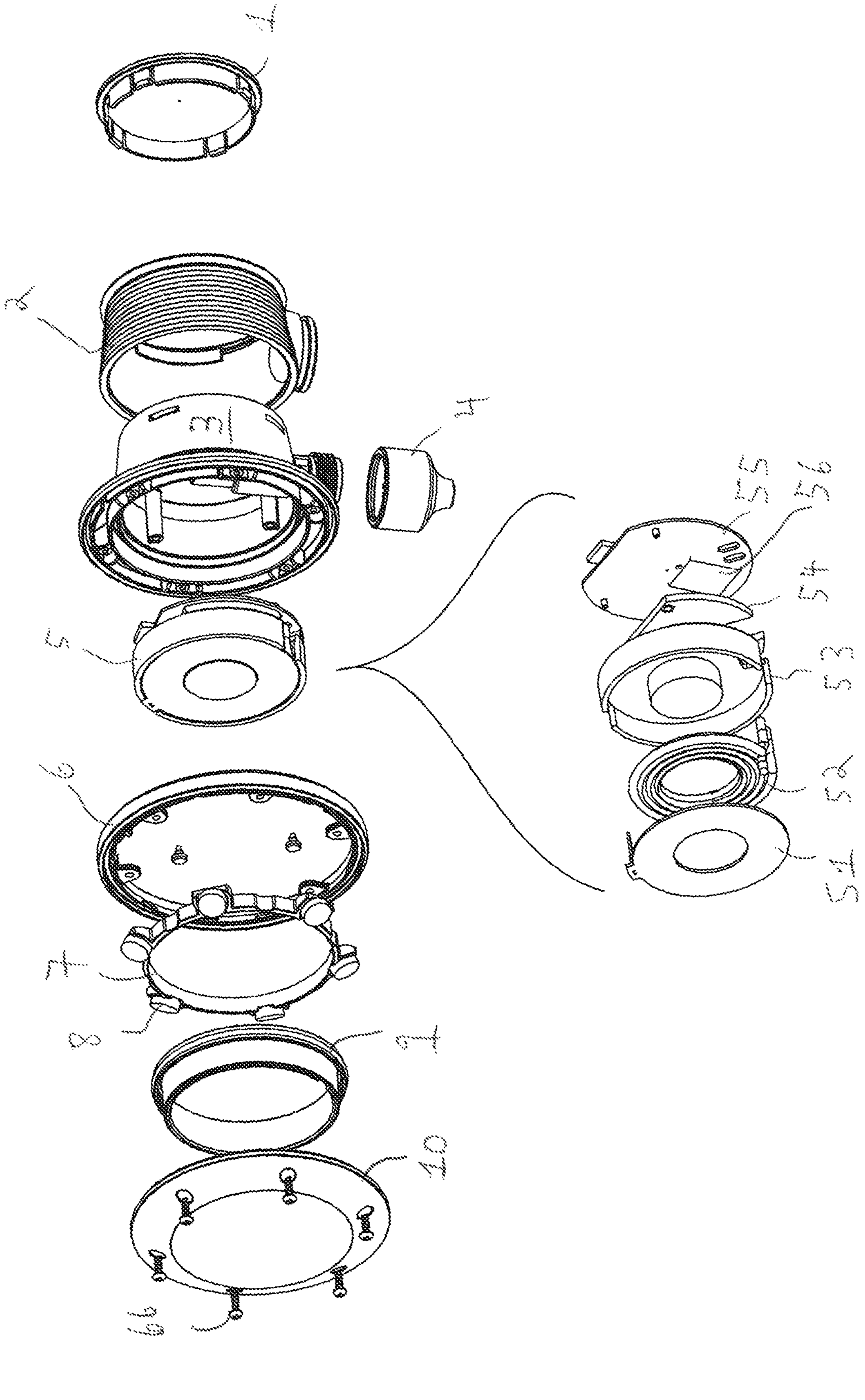
FIG. 1 illustrates an exploded view of a Rx according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF THE PREFERRED EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Any reference in the specification to a system should be applied mutatis mutandis to a method that can be executed by the system. For example—there may be provided a method for operating any of the wireless power transfer interface modules and/or the pool related platforms illustrated in the specification and/or the claims. For example—there may be provided a method for participating (receiving and/or transmitting) in a power transfer using any of the wireless power transfer interface modules and/or the pool related platforms illustrated in the specification and/or the claims.

Because the illustrated or depicted embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that can be executed by the system and should be applied mutatis mutandis to a non-transitory computer readable medium that stores instructions that once executed by a computer result in the execution of the method.

The wireless power transfer interface module may be used for transferring power from one side (transmitter) to another (receiver). The power transfer may be from the PCR to the DSU and/or from the DSU to the PCR. The power transfer may include charging, and/or powering and/or communicating. The roles of the transmitter and receiver may change over time, or may be fixed. Any reference to charging and/or powering may be applied, mutatis mutandis, to communicating.

There is provided a pool cleaning robot that may include a contactless EMC connection module that may include an embedded Tx section.

The contactless EMC connection module may be used to transfer electrical power for use with submerged pool cleaning robots.

The contactless EMC may be fully submerged underwater or located in a wet area outside the pool in vicinity of the pool's edge.

The contactless module may include a Tx section that may be embedded in a submerged wall or pool surface.

There may be three types of embedded Tx sections:

a. An In-wall embodiment whereby the Tx is inserted, embedded and secured into a pre-built tunnel dug in a pool wall. Such a tunnel may be incorporated by pre-design and construction into a newly built pool or may be incorporated into an existing pool that may, for example, be renovated or facelifted.
b. An On-wall embodiment whereby the Tx uses an existing, pre-dug tunnel that was used for other pool installations, for example, as a water return jet from main pool pump or as a submerged wall mounted spotlight and the like. The Tx is embedded and replaces these installations instead.
c. An on-deck embodiment whereby the Tx is inserted, embedded and secured into a pre-built tunnel dug in the ground of a pool deck or the external area surrounding the swimming pool Each Tx section may be connected by an electrical power cord to a power supply that may be located at a distance from the pool. The length of such a cable connecting the Tx to the power supply may have a length of, for example, 3 meters, 10 meters, 20 meters and the like. The said power supply is connected to the mains electricity supply of the building/s or construction that houses the swimming pool and is able to produce electrical power of 100, 120, 180, 200 . . . n Watts. The power supply is regulating the mains voltage and power to a safety low DC voltage below 30V, so the Tx unit is continuously attached to a safety low DC voltage.

Each Tx section is constructed and configured to receive a matching Rx section where their conductive surfaces fit and are snugly attached or connected one onto another. Both comprise a substantially flat, waterproof surface that ensures that no water, air or bubbles, dirt may enter between the Tx and the Rx flat surfaces when both are engaged.

The conductive surfaces units of both Rx and Tx parts are made of known ferrimagnetic materials such as, for example: manganese zinc ferrite, that may be produced by companies such as Magnetics, Pittsburgh, PA, USA.

In this specification the ferrite for Tx and Rx is molded or sintered using an alloy blend mixture suitable as an inductor material for this said parts. In another embodiment the ferrite may be made of a Nickel-zinc ferrite. In yet another embodiment, the blends may comprise of additions of polymeric materials such as: styrene-butadiene rubber (SBR) or natural rubber (NR) that are thermoplastic elastomers that may provide additional mechanical properties to the inherently brittle nature of the said ferrite.

Because both the Tx and especially the Rx may be exposed to in-use mechanical impacts—while being used, handled or transported—around the swimming pool additional protective measures may be applied by the use of inner seals and bumpers to provide for a better protective media for the ferrite.

In addition, after the coil winding is inserted and glued onto the base of the ferrite, a silicon sealant is applied onto the said coil and its perimeter, for better vibration resistance or contact prevention with the sidewalls of the ferrite while in motion.

Each Tx may include a base and a primary coil that is supplied with a voltage from the said power supply, an electronic switch that stabilizes and controls the power supplied and a circuit that converts direct current (DC) from a power supply to a high frequency alternating current signal.

Each Rx may include a base and a secondary coil that may create a high frequency alternating current and voltage from the magnetic field; and convert it back to DC current and voltage.

The Rx may have its own flat surface fitted onto the Tx flat surface in a manner where the engulfing water is removed and where the coil windings are configured to be aligned in order to allow energy transfer by magnetic coupling between both Tx and Rx sections. A set of magnets inside the Rx or Tx ensures that the magnetic contact prevents the Rx from being detached and disconnected from the Tx by the pull on the cable from the moving pool cleaning robot; and, to keep both surfaces in contact while the coils are correctly aligned.

Each primary or secondary coil winding may include a multi-strand or strings wire that provides optimal power supply. Each wire consists of 2, 3, 4, 5, 6 . . . n strands made from high purity and or alloy of any one of these: brass/copper//silver/gold/aluminum or an alloy mixture of any of these.

The wire/strand each have a resistance of 0.01, 0.02-0.05 . . . n Ohms per meter. The wire/strand may have a gage section of 0.05, 0.10, 0.15 . . . n mm The winding may be configured to be turned between 1, 5, 10, 20, 30 . . . 50 . . . n turns where the primary and secondary have equal number of turns or the primary has more turns or the secondary has more turns.

Wireless data transmission is provided between the Rx and the Tx for data sent from the pool cleaning robot to the Rx and/or the Tx, to the power supply and to a user or a user that may be able to receive and send wireless messages by means of a computerized device.

There is provided a primary and/or secondary coil winding temperature measurement device.

Both Tx and Rx may include fast adaptive computer-controlled switching mechanisms that are responsive to the pool cleaning robot varying load consumption.

A focused electromagnetic beam provides tolerance in distance between the Tx and the Rx; namely, a flexible height adjustment.

The EMC system described in this specification provides for a low loss and high-power efficiency consumption (example: 50, 60, 70, 80, 100% power utilization).

The EMC system described in this specification provides for low voltage power pairing.

The EMC system described in this specification provides special means for protection from electromagnetic radiation (EMI shielding), these means may include a radiation blocking paint or a foil shield that block magnetic radiation and reduces the maximum total SAR to the end-user below the safety levels.

EMC system described in this specification provides for a high frequency modulation that provides high efficiency and electricity safety (100-200 Khz) so in case of a defective broken enclosure, the Tx power will not impose electrocution risk to the end user.

The EMC system described in this specification provides for an automatic turn on by attachment of the Rx to the Tx.

Underwater wireless control communication that is provided by and additional antenna and transmitter/receiver for control signals on different frequency (2 Mhz) in order to provide for a two-way data transfer platform.

The Tx and/or the Rx may include attachment with magnets. Tx can be installed inside a niche on pool side or on pool wall or on an existing jet.

Figure 17:
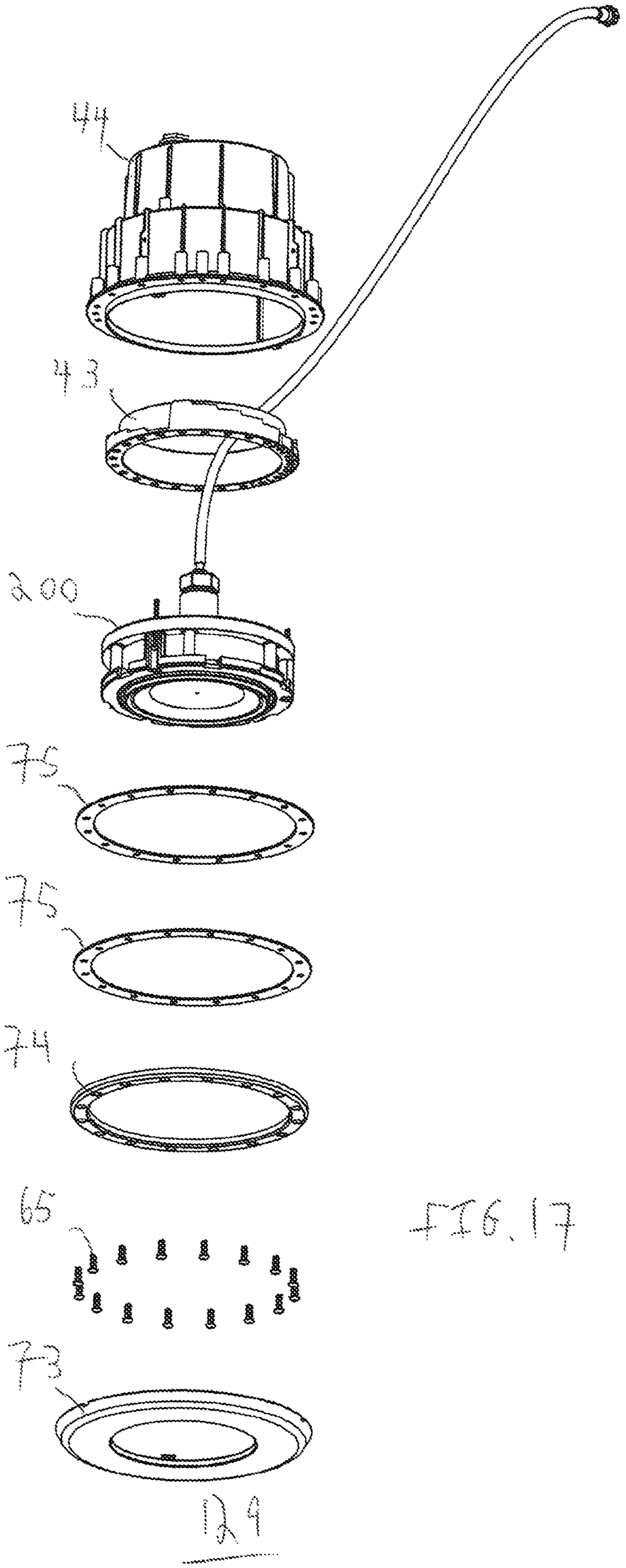
FIG. 17 illustrates a detailed exploded view of a submerged embedded in-wall Tx according to embodiments of the invention.

The LED indication light for status of the Tx and/or the Rx. Referring to FIG. 17—it illustrates various components that can be used in certain type of pools covers (for example PVC)—while at least some of the parts (74, 75 or 65) may not be used in other types of pool surface covers (for example concrete).

Additional features may include (not shown):

a. The said LED lighting arrangement that may be fitted onto a PCR, a TX or and an RX are described in detail in the specification and/or drawings.
b. Arrangement to fit and above water GPS fixed location.
c. Arrangement to fit pool condition sensors (temperature, water chemistry compositions).
d. Arrangement for pool cleaning robot on board battery charging.
e. Arrangement for installing an intruder pool alarm device and system.
f. Arrangement for installing an underwater speaker.
g. Arrangement for installing a 'home' beacon device for the pool cleaning robot to recognize location of the Tx and be able to navigate to such a location.

FIG. 1 is an example of a Rx that includes the following sequence (along a longitudinal axis of the Rx)—Rx front cover 10, Rx inner seal 9, a combination of magnets 8 held by a Rx magnet holder 7, RX electronics module 5, Rx body 3 that includes a Rx nut or bumper at a direction that is normal to the longitudinal axis of the Rx, Rx body bumper 2 and Rx top cover 1. Cover screws 66 are used to fasten the Rx front cover 10 to the Rx body 3.

The Rx electronics module 5 includes the following sequence (along a longitudinal axis of the Rx)—antenna PCB 51 for Rx/Tx wireless communications, induction coil winding 52, ferrite 53, Rx heat sink 54 and a combination of Rx PCB 55 and Thermal pad 56 located on a part of the Rx PCB.

Figure 2:
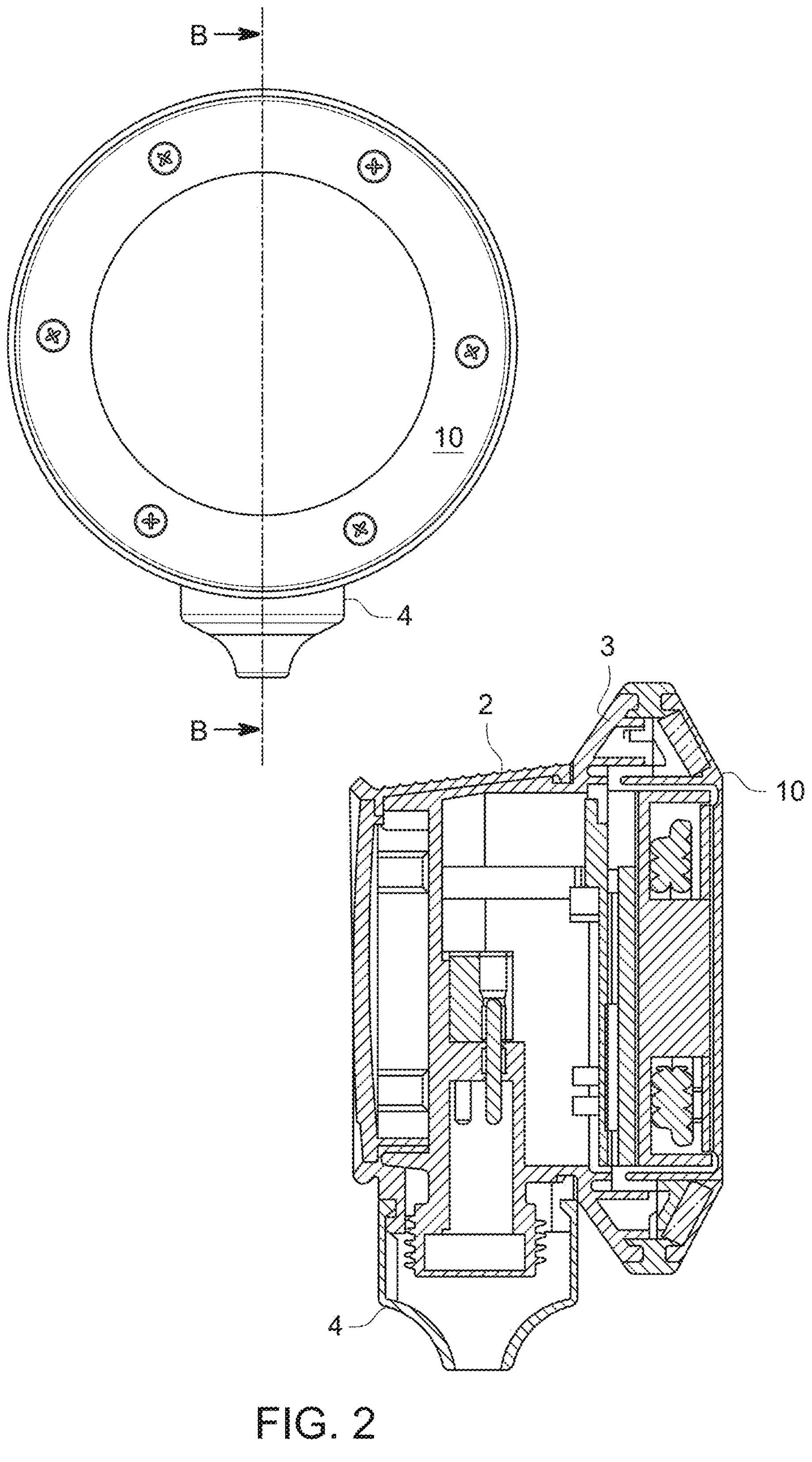
FIG. 2 illustrates a front and cross section views of a Rx according to an embodiment of the invention.

FIG. 2 illustrates a front view of the Rx and a cross sectional view of the Rx depicting Rx nut bumper 4 that, as will be discussed further-on, impact protects the PCR electrical cable 6 and its connections at the entry to the said Rx module 100.

Figure 3:
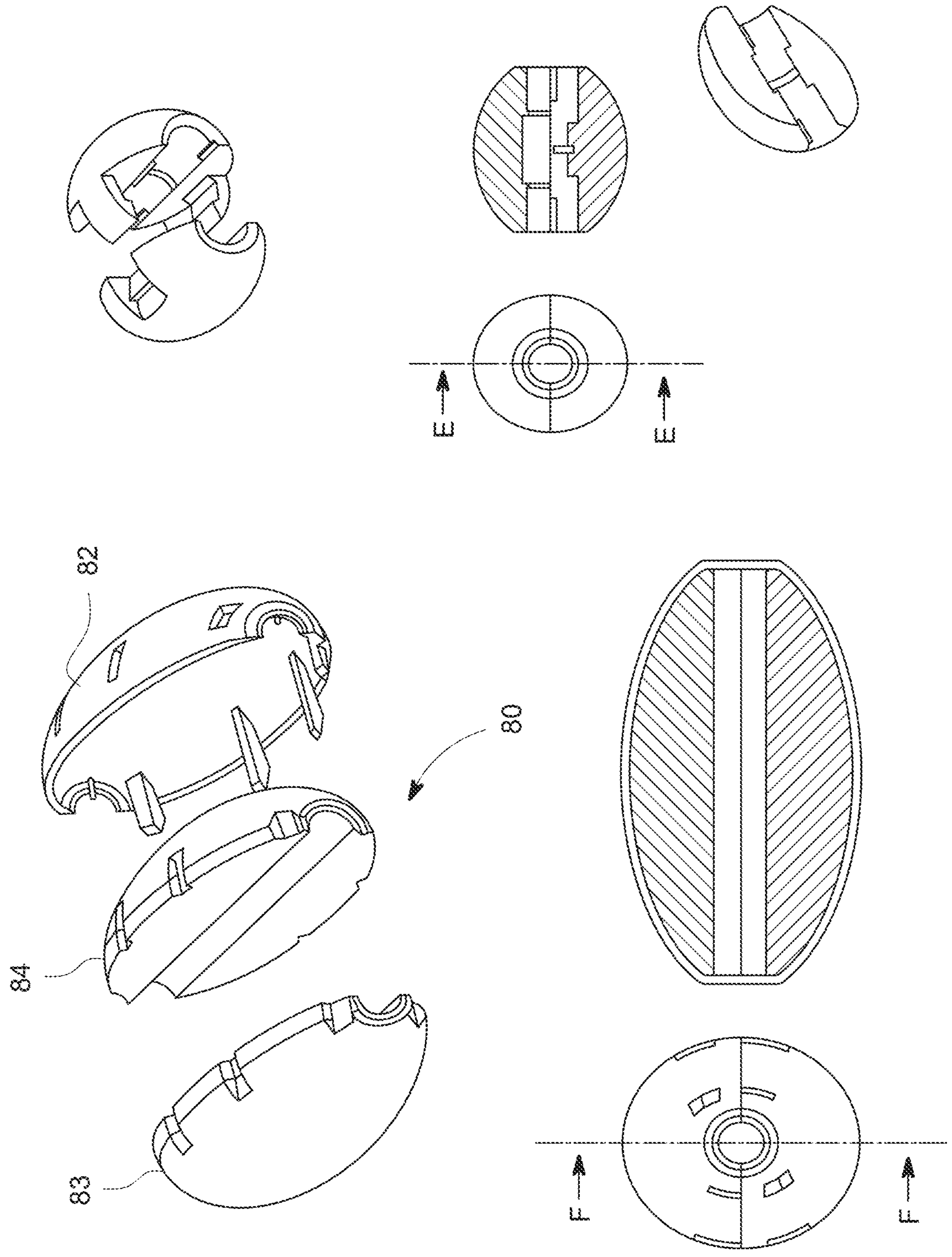
FIG. 3 illustrates electrical cable cord floatation devices according to an embodiment of the invention.

FIG. 3 illustrates an example of a Rx cable float module such as a floating cable float 80 that includes two halves 81 and 82 of a swivel housing and two floating parts 83 and 84 of the swivel float. A cable passes through a recess formed in the two floating parts. Also illustrated is an exploded view of swivel float 89 (see FIG. 26)

Figure 4:
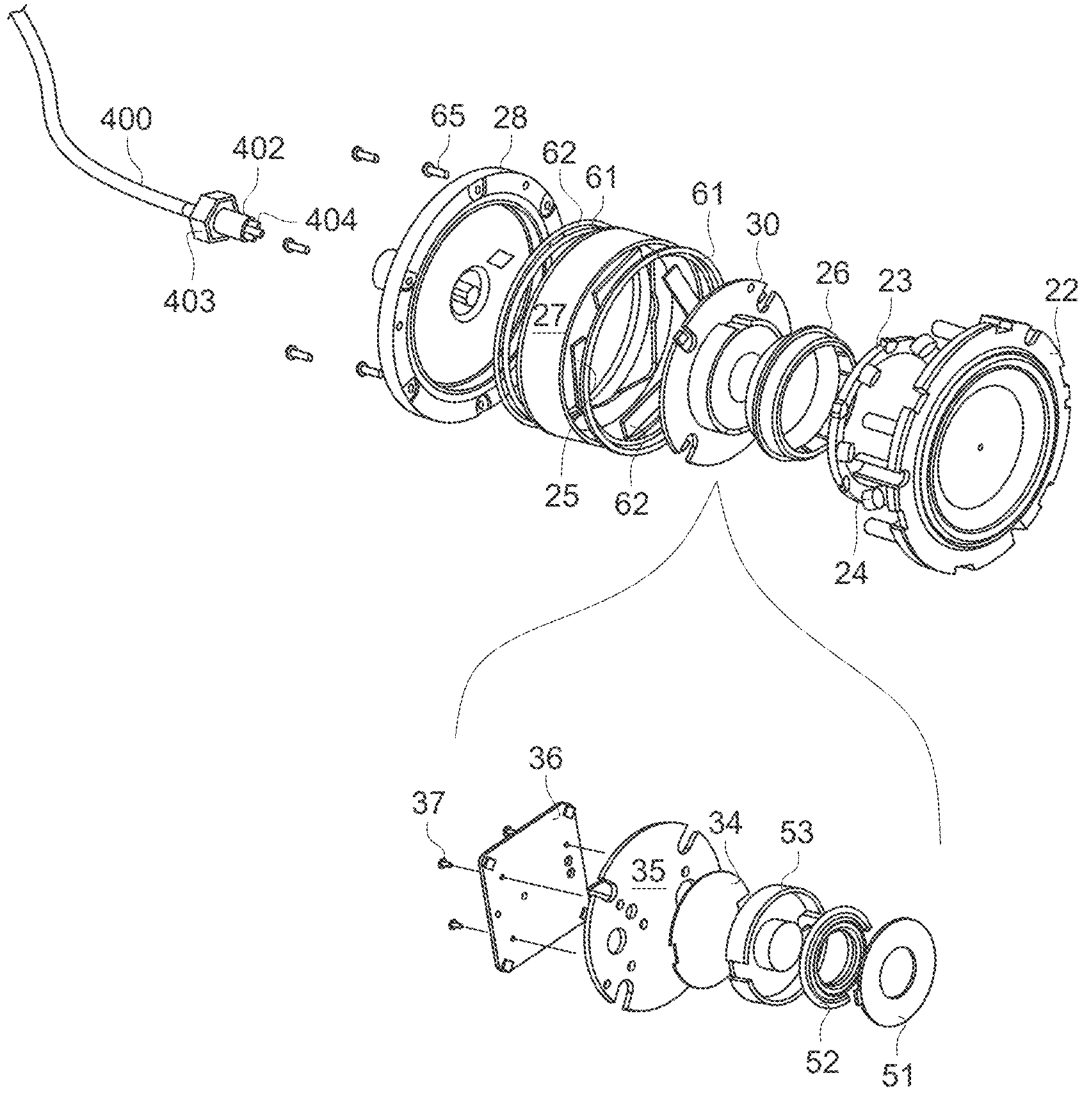
FIG. 4 illustrates an exploded view of a submerged embedded Tx according to an embodiment of the invention.

FIG. 4 is an example of a Tx that includes the following sequence (along a longitudinal axis of the Tx)—Tx top/front cover 22, a combination of Tx magnets holder 23 and magnets 24, Tx inner seal 26, Tx electronics module 30, O-rings 61 and 62, Tx brass tube 27 and thermal pads 25 for brass tube, O-rings 61 and 62, and Tx back/bottom cover 28 that are fastened to the Tx top/front cover 22 by Tx screws 65. This figures also illustrates Tx cable 400, sealed terminal connection 402, cable wiring pin connections 404 and nut for terminal 403.

The Tx electronics module 30 includes the following sequence (along a longitudinal axis of the Tx)—antenna PCB 51 for Rx/Tx wireless communications, induction coil winding 52, Ferrite 53, Thermal pad for Tx 53, Rx heat sink 34, Aluminum heat sink for Tx 35, and Tx PCB 36 that is fastened to the Aluminum heat sink for Tx 35 via screws 37.

Figure 5:
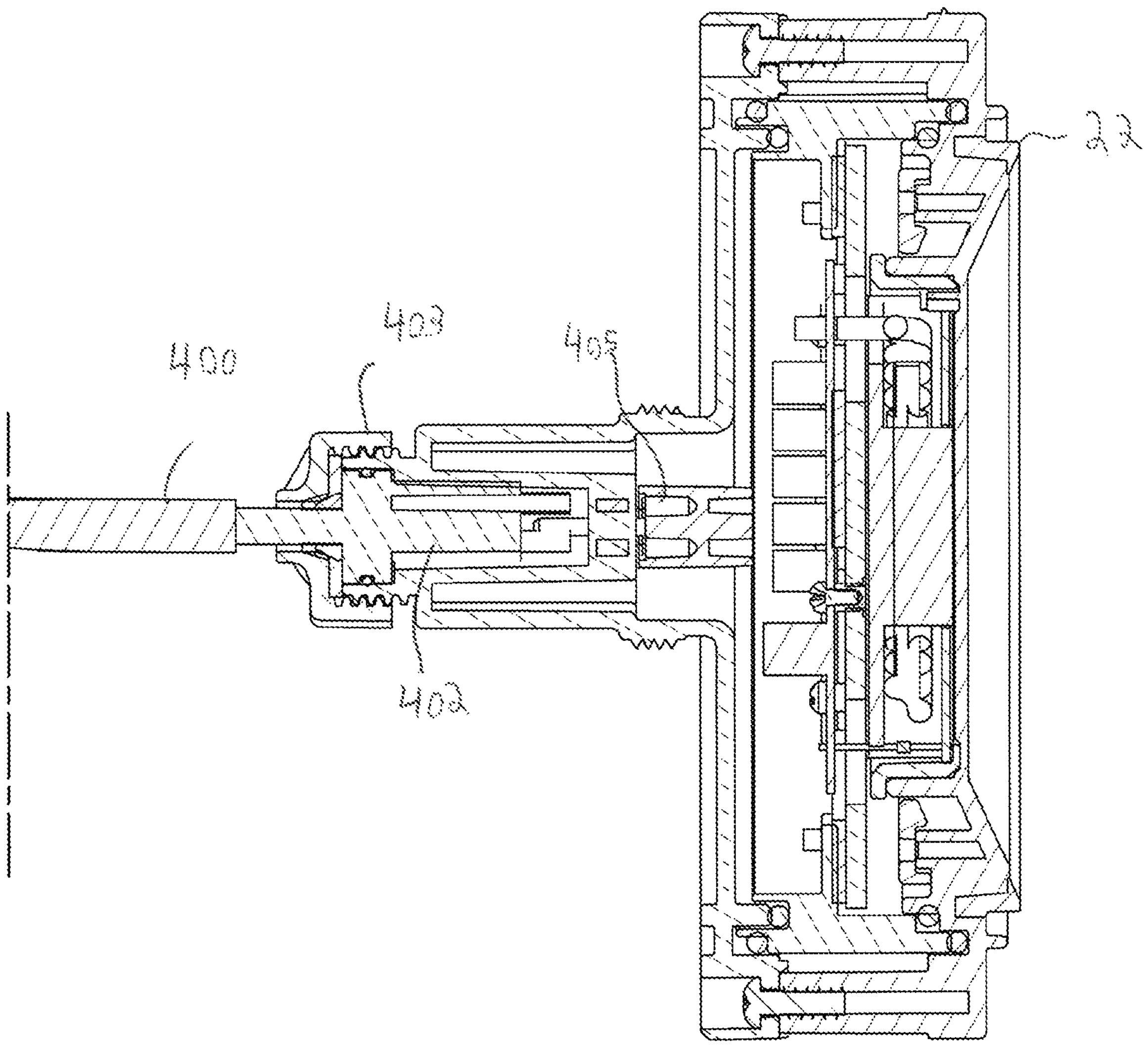
FIG. 5 illustrates a cross section views of a submerged embedded Tx according to an embodiment of the invention.

FIG. 5 is an example of a cross section of the Tx connected to cable 400 that include a nut for terminal 403, a sealed terminal connection 402 and cable wiring connectors 405.

Figure 6:
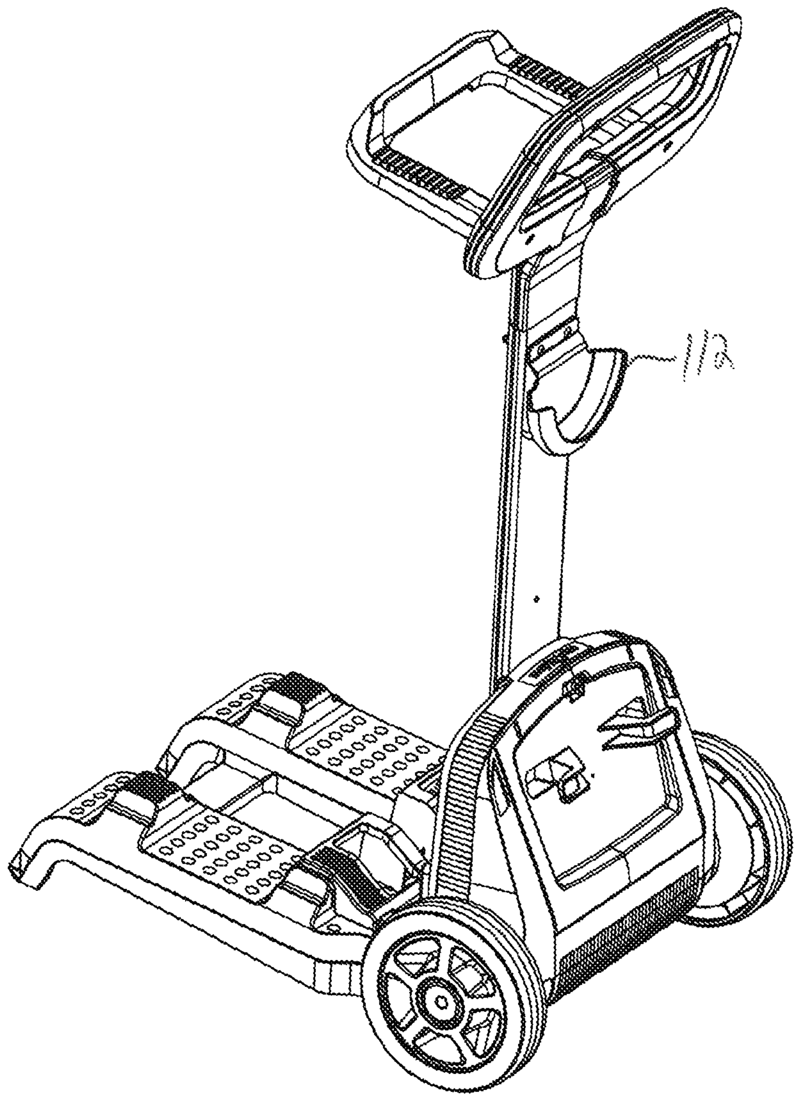
FIG. 6 illustrates a carriage caddy for transportation of a pool cleaning robot according to an embodiment of the invention.

FIG. 6 is an example of caddy for carrying a PCR that includes a Rx caddy seat 112.

Figure 7:
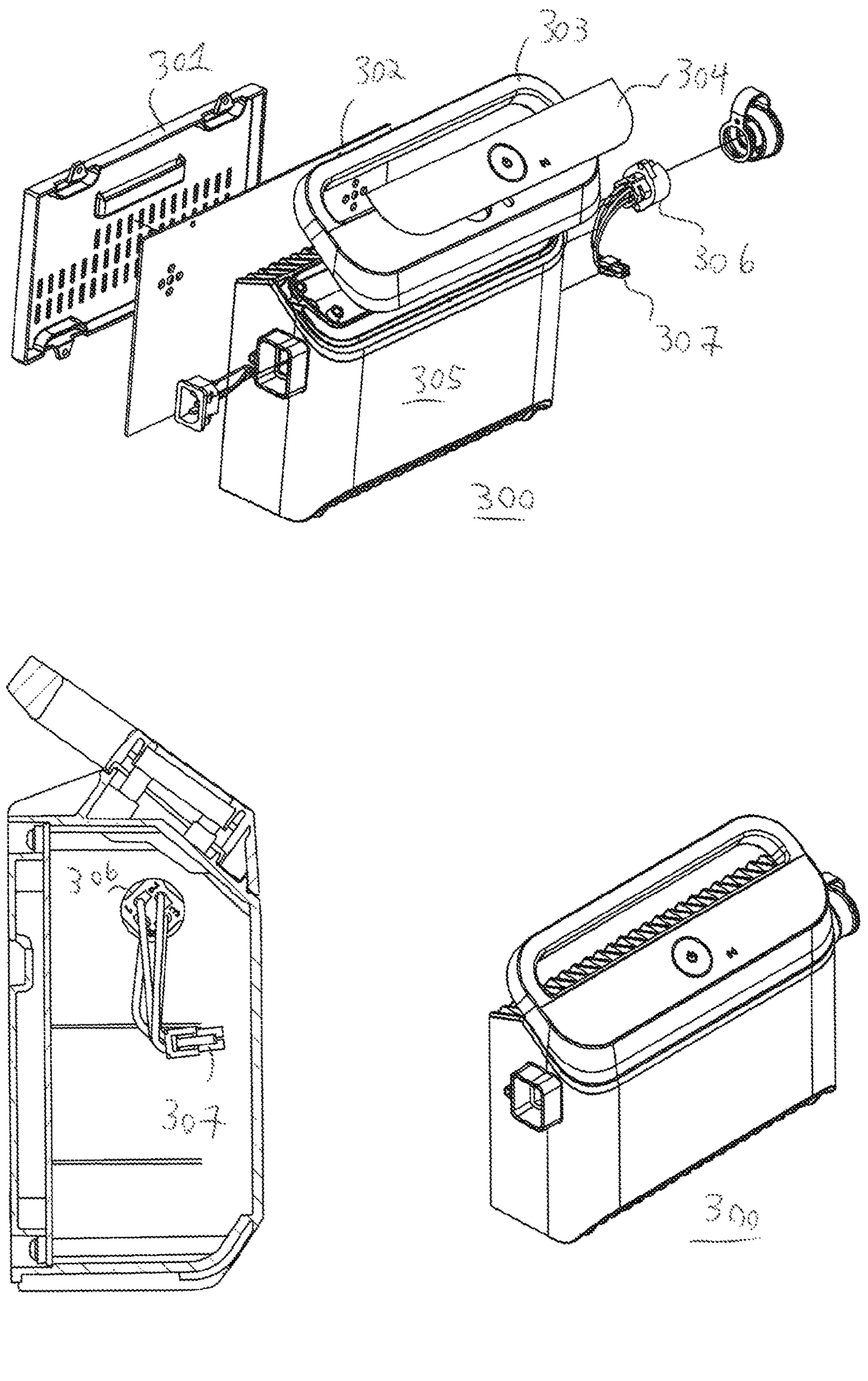
FIG. 7 illustrates a power supply transformer and an explosion view thereof according to an embodiment of the invention.

FIG. 7 is an example of external power supply 300 that includes main body 305, rear sidewall 301, PCB 302, top-front frame 303, panel 304, socket 306 and cable connector 307.

Figure 8:
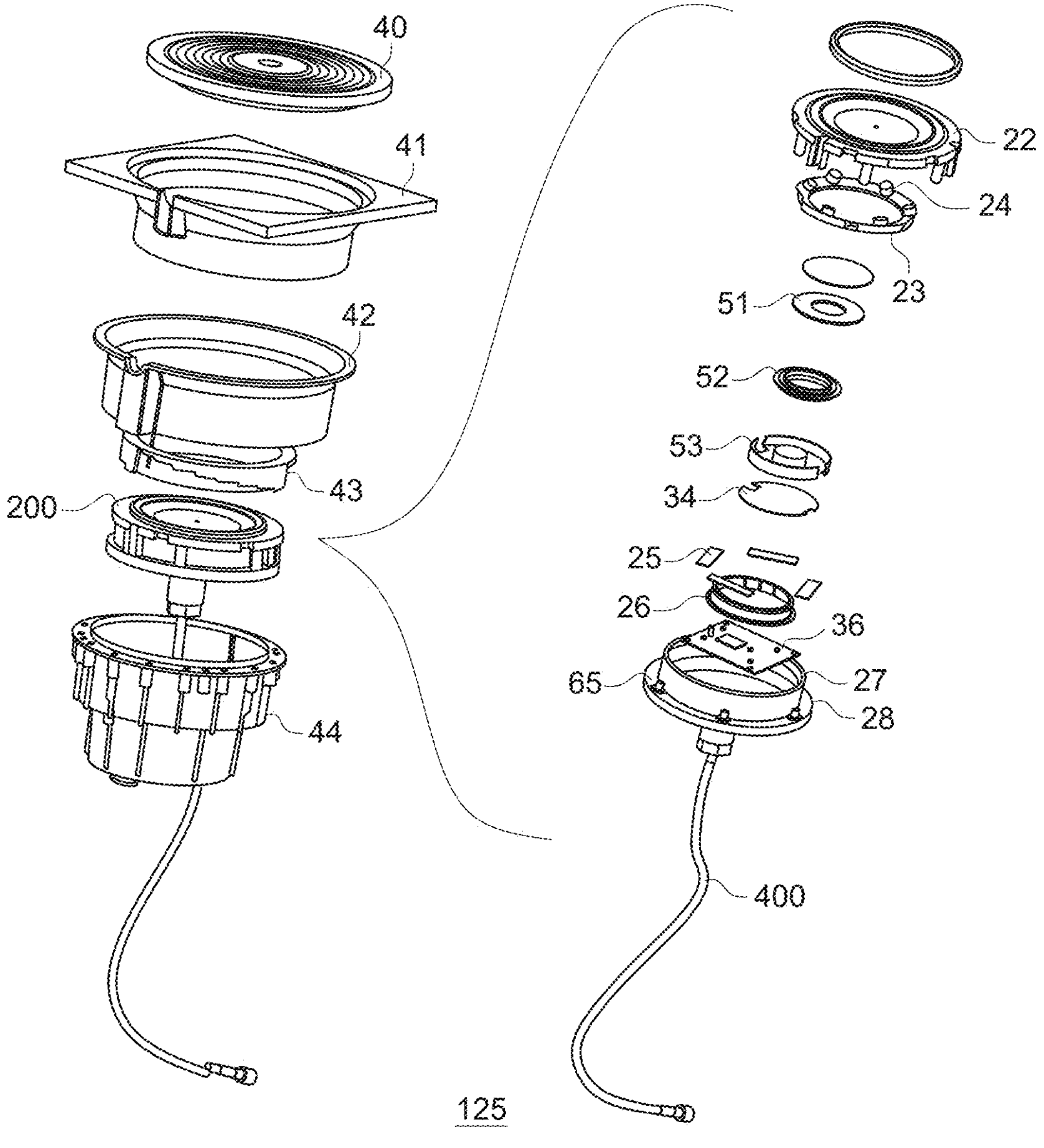
FIG. 8 illustrates an exploded view of an external, deck floor embedded Tx according to an embodiment of the invention.
Figure 9:
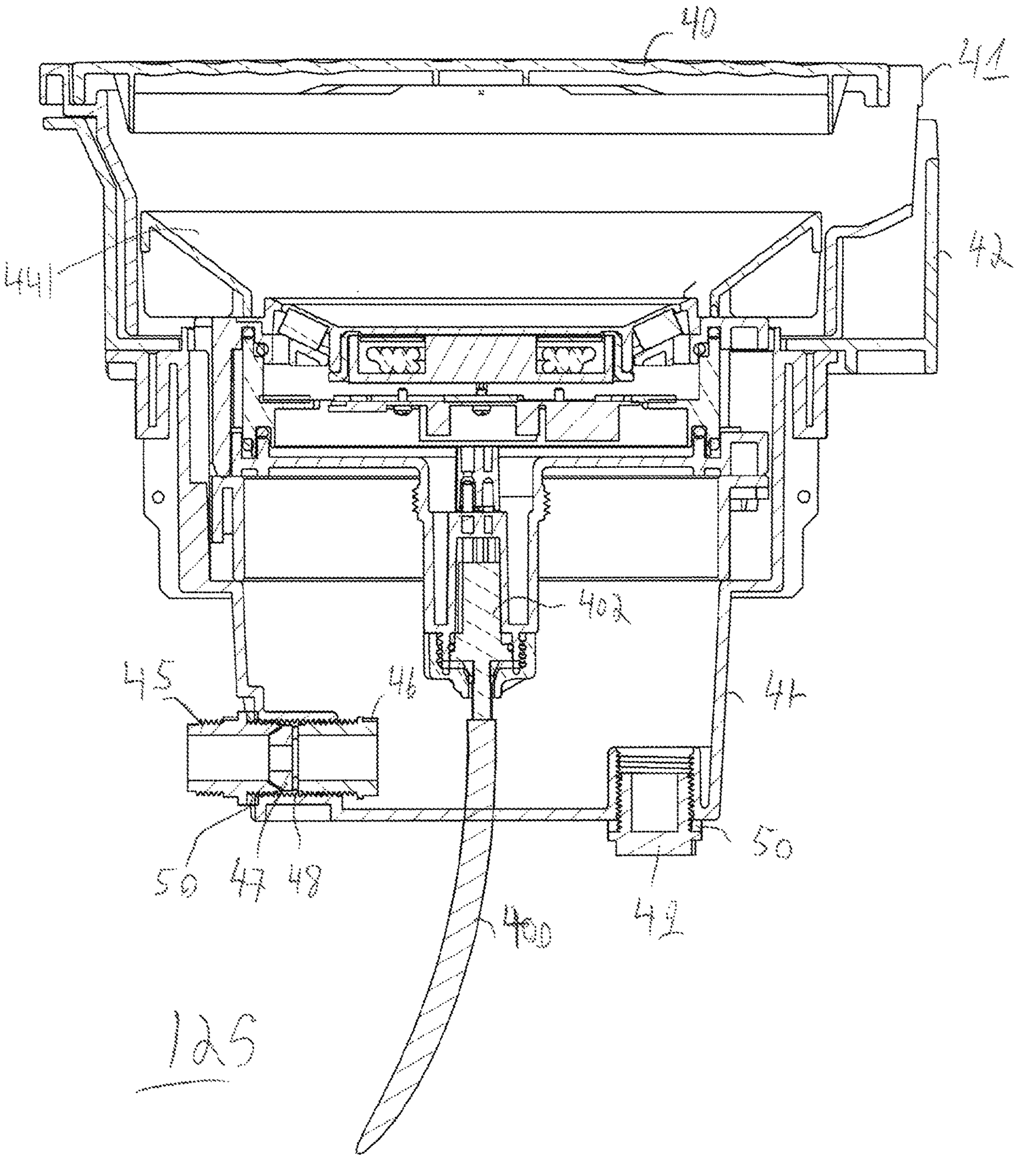
FIG. 9 illustrates an exploded cross section view of an external, deck floor embedded Tx according to an embodiment of the invention.

FIGS. 8 and 9 provide examples of an in-floor Tx 125 to be located within a floor or a wall interred niche-for example inside an external deck floor niche near or alongside the pool. FIG. 8 illustrates the Tx-in floor as including the following sequence (along a longitudinal axis of the Tx in-floor)—cover for in-floor Tx niche 40, upper section for Tx niche 41, adapter for Tx niche 42, flexible adapter for Tx 43, Tx module 200, and niche base for Tx niche 44.

The Tx module 200 includes the following sequence (along a longitudinal axis of the Tx in-floor)—Tx top/front cover 22, a combination of Tx magnets holder 23 and magnets 24, antenna PCB 51, induction coil winding 52, ferrite 53, thermal pads 25, Tx inner seal 26, Tx PCB 36, Tx brass tube 27, Tx back/bottom cover 28 that is fastened to the Tx top/front cover 22 by screws 65. A cable 400 having a cable plug for power supply 401 is connected through the Tx back/bottom cover 28 and leads to a power supply that may be located away from the immediate pool area such as in the pool pump engine room.

FIG. 9 which is a cross-sectional view of an example of the in-floor Tx of FIG. 8 includes the following reference numbers-cover for in-floor Tx niche 40, upper section for Tx niche 41, adapter for Tx niche 42, base for Tx niche 44, adapter for PG nut 45, PG nut for base cable 46, PG nut RK ring seal 47, Plastic washer 48, stopper for base PG nut 49, Seal for base PG nut 50, and floor gasket for Tx niche 441.

Figure 10:
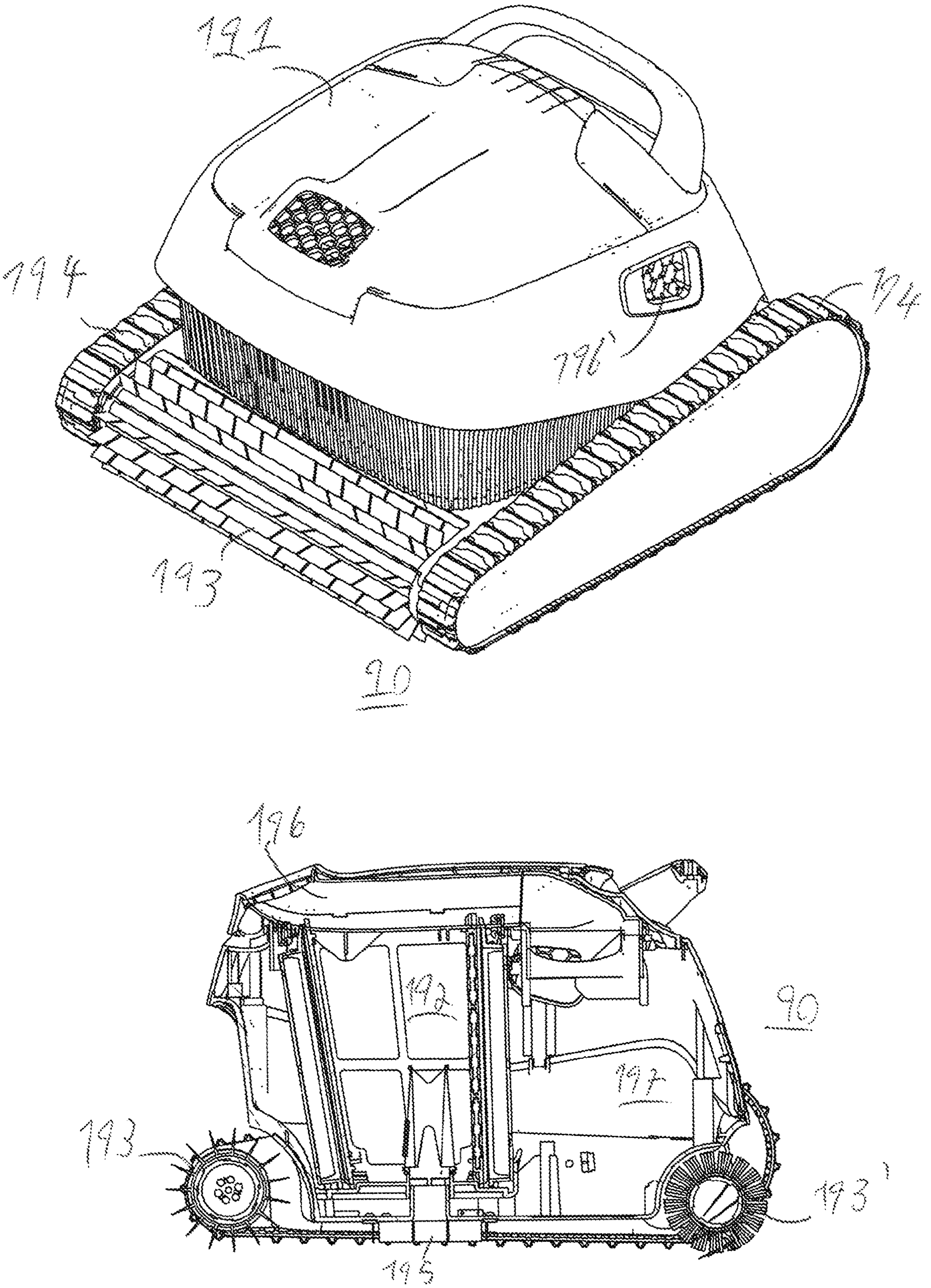
FIG. 10 illustrates pool cleaning robot and a cross section thereof.
Figure 11:
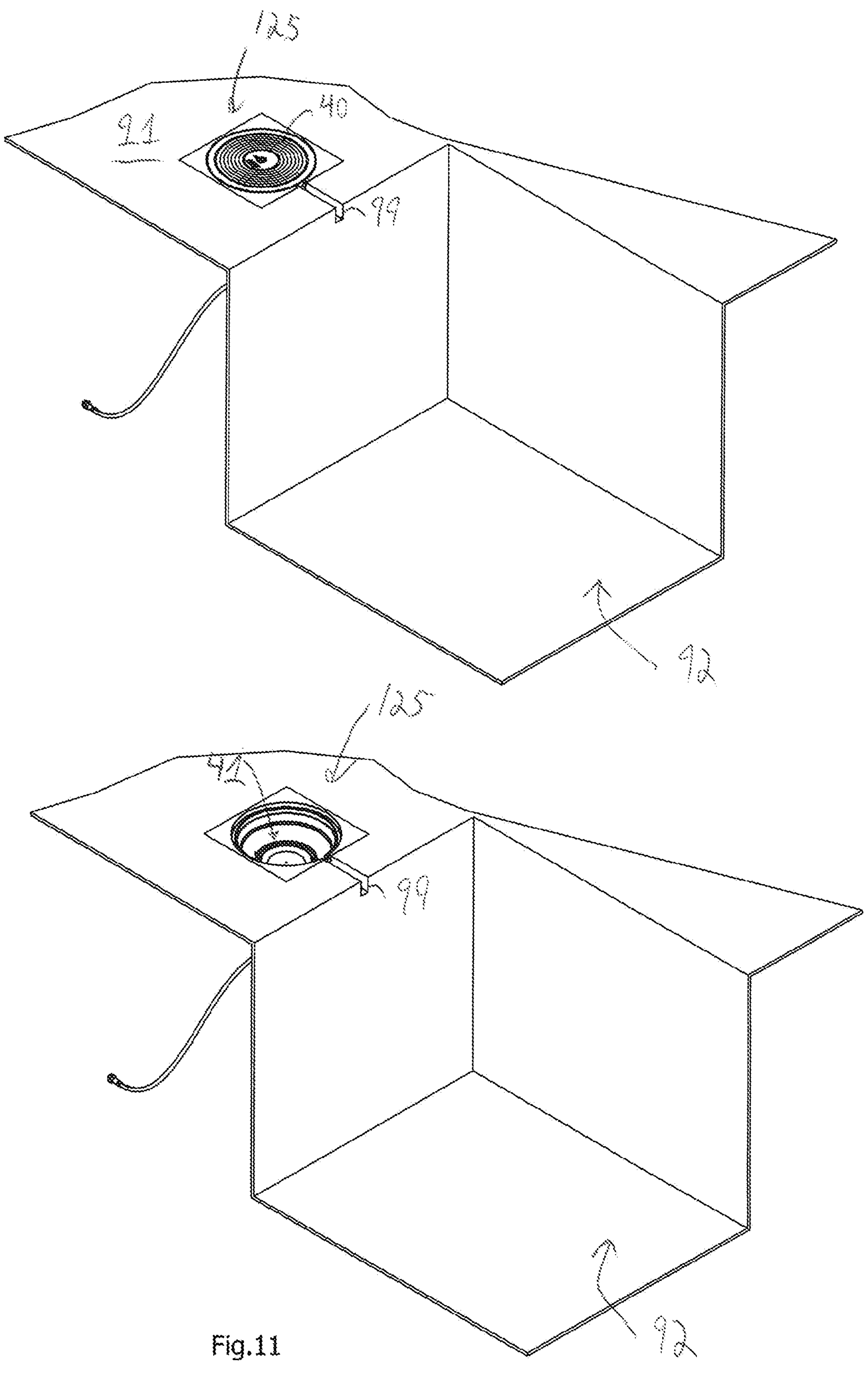
FIG. 11 depicts covered and uncovered external manhole, deck floor embedded Tx according to an embodiment of the invention.

FIG. 10 is an example of PCR 90 that includes housing 191, filtering unit 192, brush wheels 193, and 193', tracks 194, fluid inlet 195, fluid outlets 196 and 196', inner space 197 defined by a inner housing and enclosed a motor unit and electronics, power supply (not shown) as well as various other components. The PCR may include, for example, and in addition to or instead of the mentioned above parts-a pump motor, a drive motor, an impeller, any propulsion system, an electronic module of the PRC, and/or any other part of the PCR. Non-limiting example of PCRs and their parts are provided in U.S. Pat. Nos. 9,410,338, 10,533,335, 10,843,106, 10,458,139, 11,124,982, 10,858,852, 10,982,456—which are incorporated herein by reference FIG. 11 illustrates examples of covered and uncovered in-floor Tx 125 installed in floor 91 whereas a tunnel 99 is formed between the in-floor Tx 125 and the pool-to receive a cable (not shown) to the PCR 90 in the pool 92. The cover for in-floor Tx niche 40 is shown in the covered in-floor Tx 125, while the upper section for Tx niche 41 is shown in the uncovered in-floor Tx 125.

Figure 12:
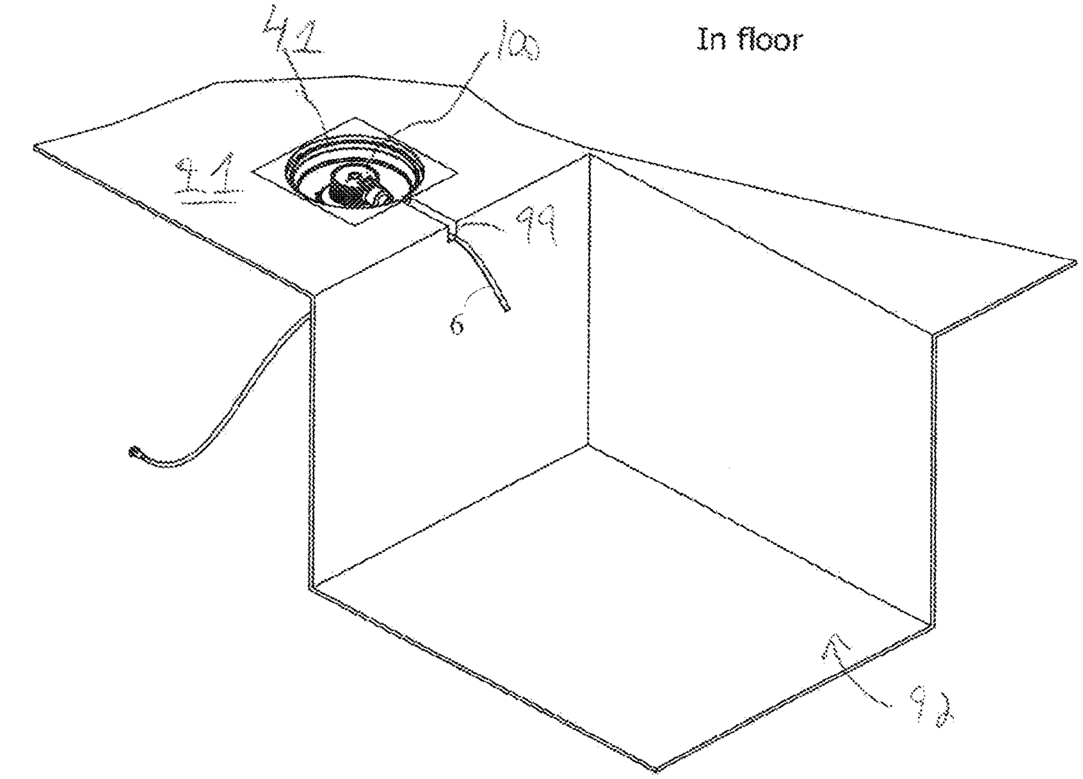
FIGS. 12 and 13 depict deck floor embedded Tx with an in-use Rx arrangement.
Figure 13:
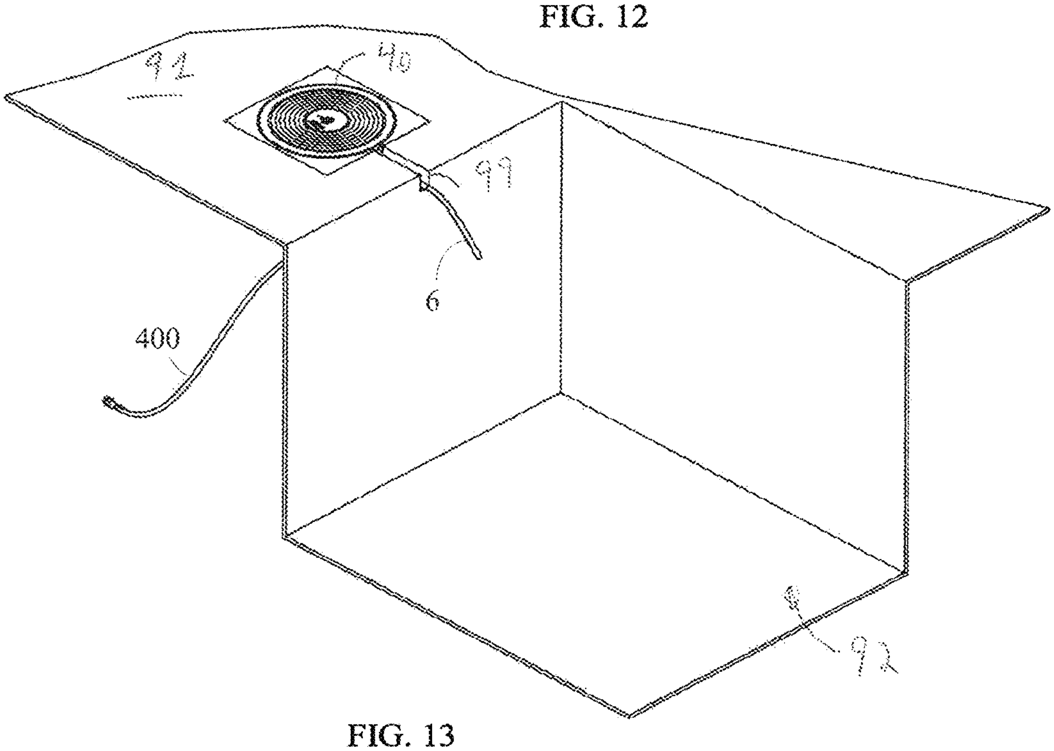

FIGS. 12 and 13 illustrates examples of covered and uncovered in-floor Tx 125 installed in floor 91 and having cable 400, whereas a Rx module 100 is attached or connected to the in-floor Tx 125. Tunnel 99 is formed between the in-floor Tx 125 and the pool-to receive a cable 6 that connects and provides electrical power to the PCR 90 in the pool 92. The cover for in-floor Tx niche 40 is shown in the covered in-floor Tx 125, while the Rx Module 100 and cable 6 are shown in the uncovered in-floor Tx 125.

Figure 14:
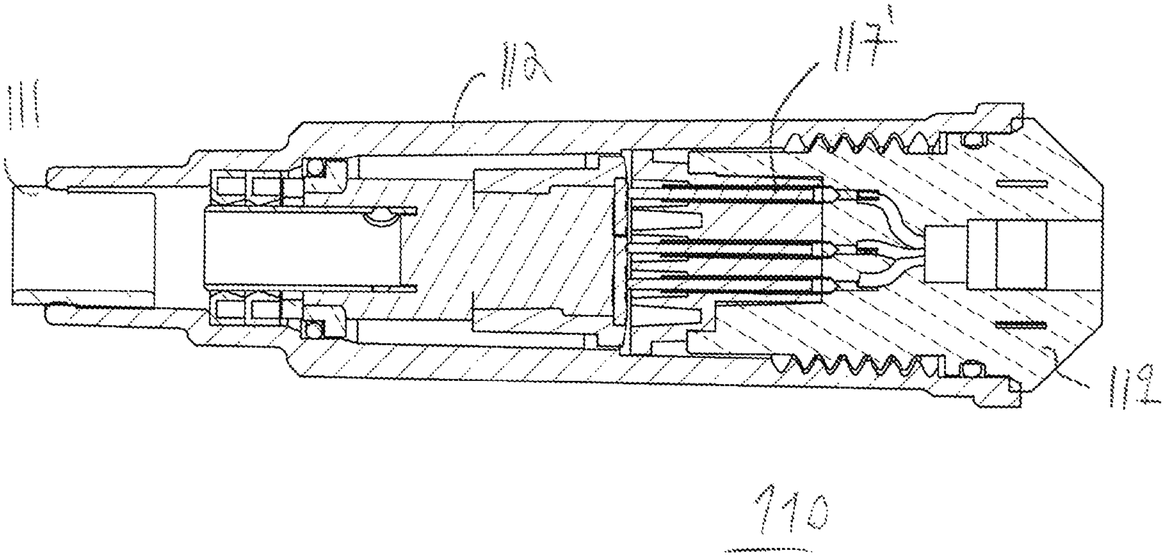
FIG. 14 illustrates a sideview cross section of Rx cable swiveling device according to an embodiment of the invention.

The cover for in-floor Tx niche 40 includes special protection from electromagnetic radiation (EMI shielding). This protection may include a radiation blocking paint or a foil shield that blocks magnetic radiation from coming in contact with swimmers or users of the swimming pool to reduce the maximum total specific absorption rate (SAR) to the end-user to below the safety levels;

FIG. 14 illustrates an example of swivel 110. An example of a swivel can be found in European patent EP1383205 which is incorporated herein by reference. FIG. 14 illustrates the swivel 110 that, importantly is positioned near or close to the PCR (see FIG. 26) so that the cable entanglements may be effectively released. Any positioning of the said swivel mechanism close to the Rx 100 (or Tx in FIGS. 4 & 5 and the Tx 125 may render the swivel useless. The swivel include a sleeve 119, includes three spring loaded contact plungers 117' and is connected to multi-lead cable 111.

Figure 15:
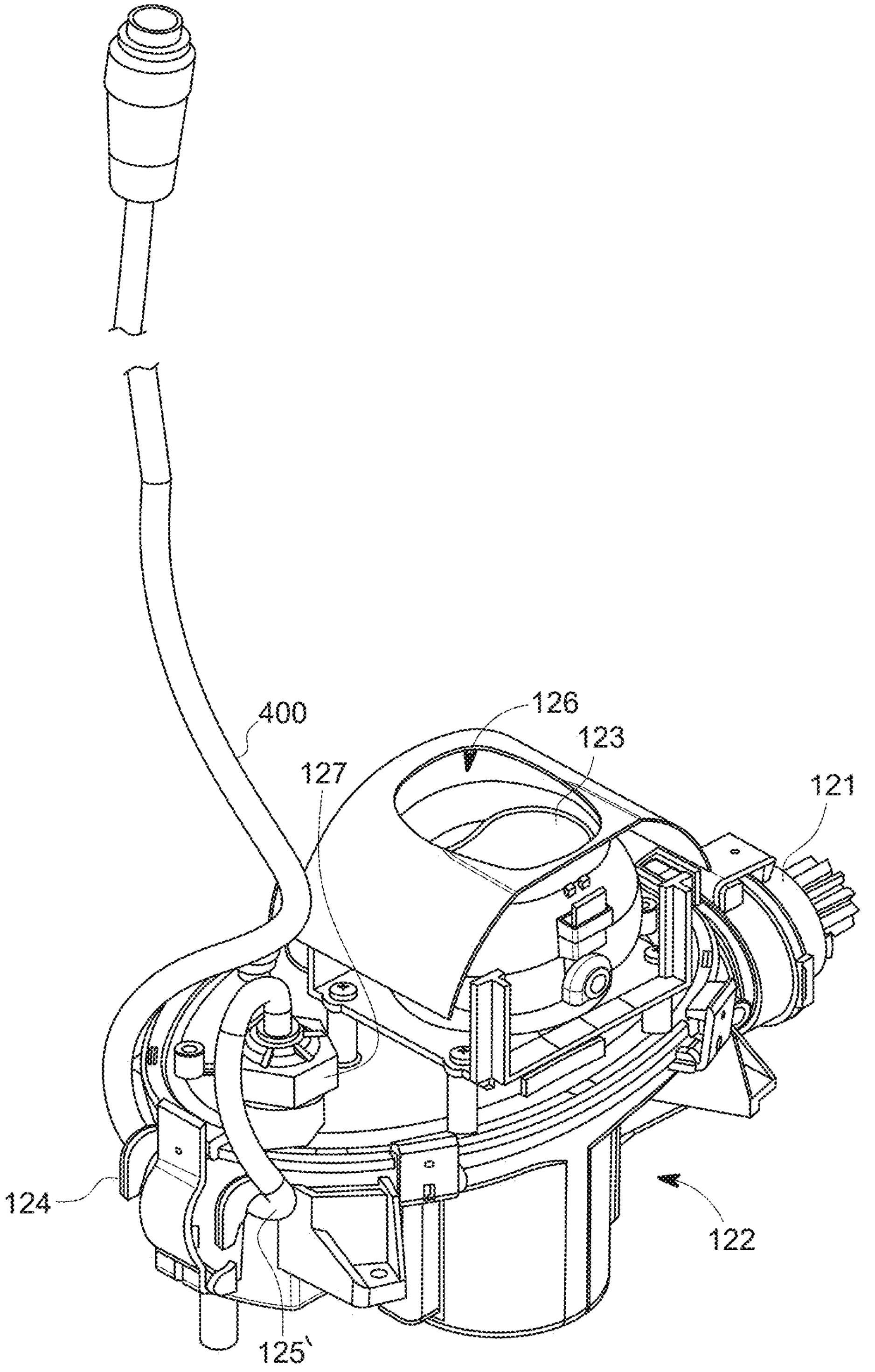
FIG. 15 depicts a Rx cable securing and sealing mechanism on the pool cleaning robot according to an embodiment of the invention.
Figure 16:
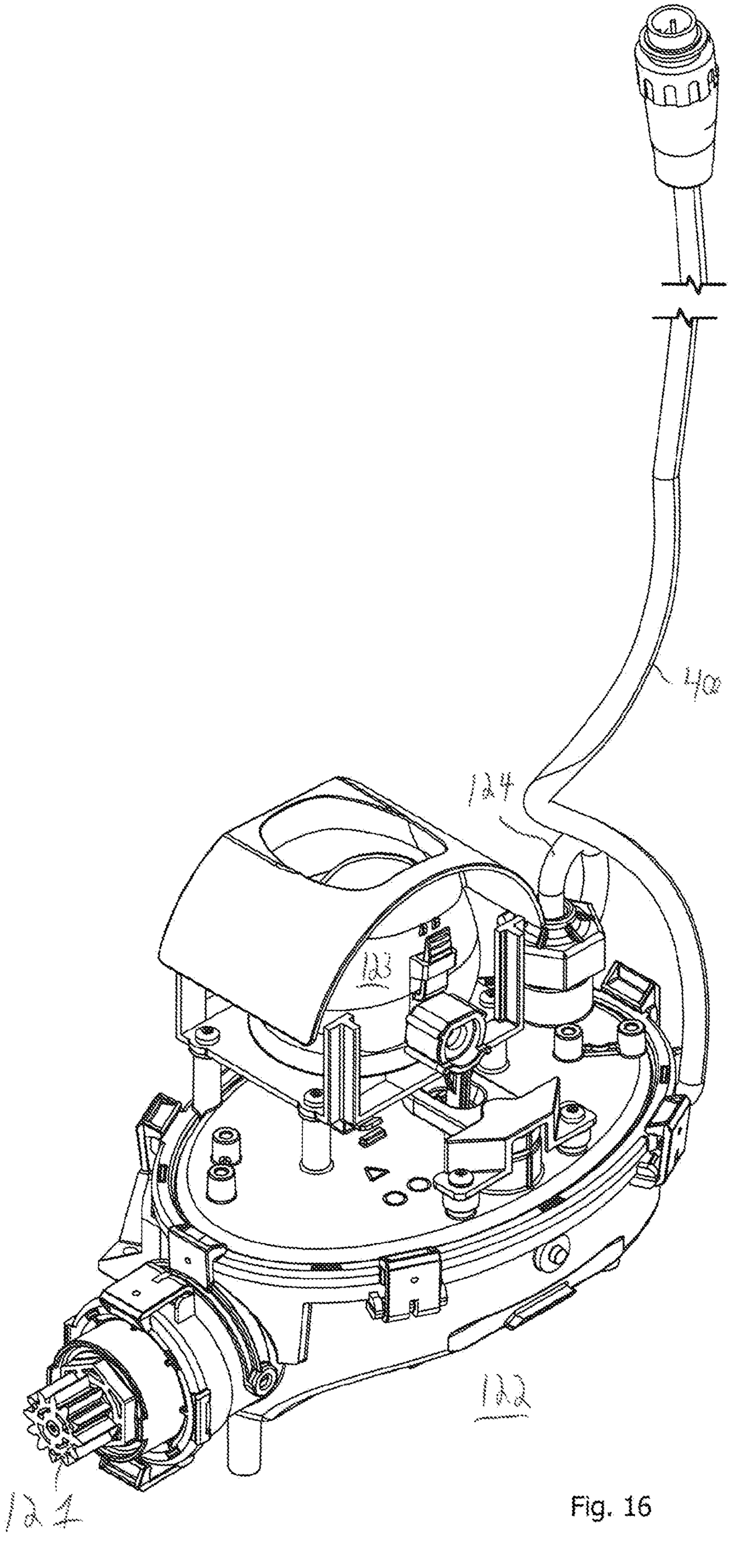
FIG. 16 illustrates a pool cleaning robot motor unit with pump and drive motors according to an embodiment of the invention.

FIGS. 15 and 16 illustrate various parts of PCR 90 such as movable fluid nozzle 123, downstream opening 126, drive motor 121, pump motor and electronics housing 122, cable grip holder 124 for holding cable 6 (see FIG. 26), bent part 125' of cable 6 (see FIG. 26), the cable 6 is connected to motor electrical nut closure connection 127. Cable 6 may be connected at its other end the Rx 100 see FIG. 26).

In order to protect the cable and its electrical connections from being pulled apart from the motor unit 122, the cable is assembled in a manner where the cable is bent and inserted into cable grip holder 124 for holding cable depicting the bent part 125' of cable 6.

FIG. 17 illustrates an example of Tx In-wall 129 as including the following sequence (along a longitudinal axis of the Tx in-wall)—Tx wall gasket 73, flange for PVC niche 74, seals for PVC niche 75, Tx module 200, flexible adapter for Tx niche 43 and niche base for Tx niche 44. The Tx wall gasket 73 is fastened to the niche base for Tx niche 44 by screws 65.

The said in-wall 129 embodiment is used when the Tx is inserted, embedded and secured into a pre-built tunnel dug in a pool wall. Such a tunnel may be incorporated by pre-design and construction into a newly built pool or may be incorporated into an existing pool that may, for example, when the pool is renovated or facelifted.

Figure 18:
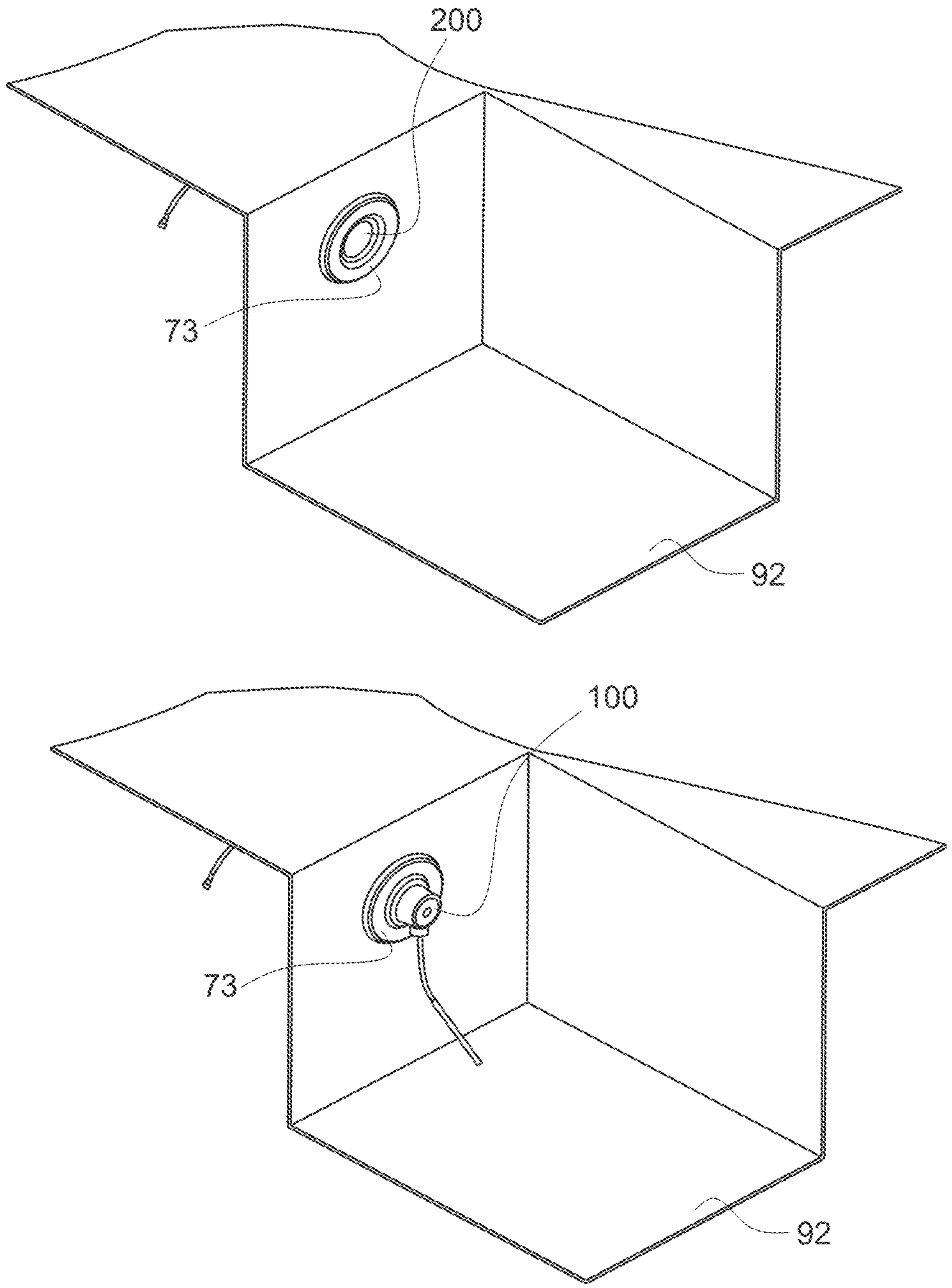
FIG. 18 depicts a wall mounted embedded Tx with in-use connected Rx both submerged according to an embodiment of the invention.

FIG. 18 illustrates examples of in-wall Tx 129 installed in a wall of the pool. In the upper part of FIG. 18 the in-wall Tx 129 is not connected to a Rx module—and Tx wall gasket 73 and the Tx module 200 are shown. In the lower part of FIG. 18 the Tx module 200 is connected to the in-wall Tx 129 and a part of the Tx wall gasket 73 is shown.

Figure 19:
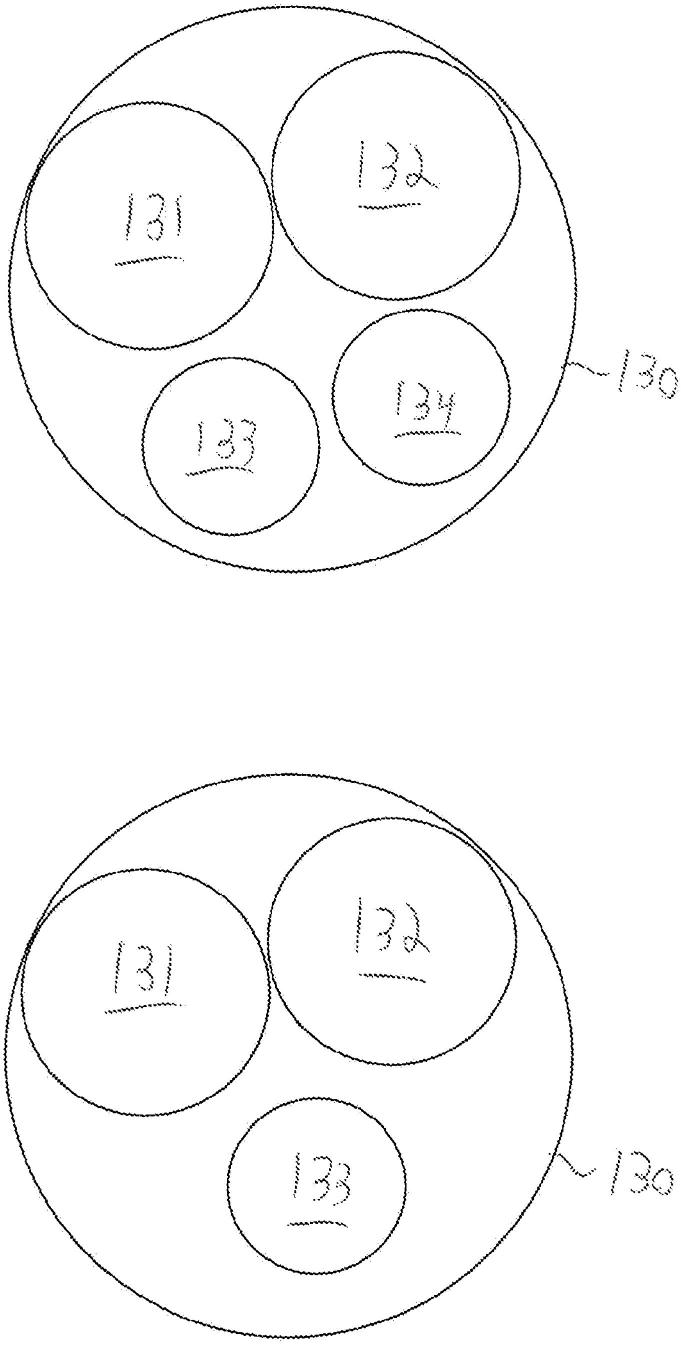
FIG. 19 depicts a cross section of electrical wiring conduits of a Rx cable

FIG. 19 illustrates example of cross section of a four-wire cable 130 that includes wires 131-134, and of a three-wires cable 130' that includes wires 131-133.

Figure 20:
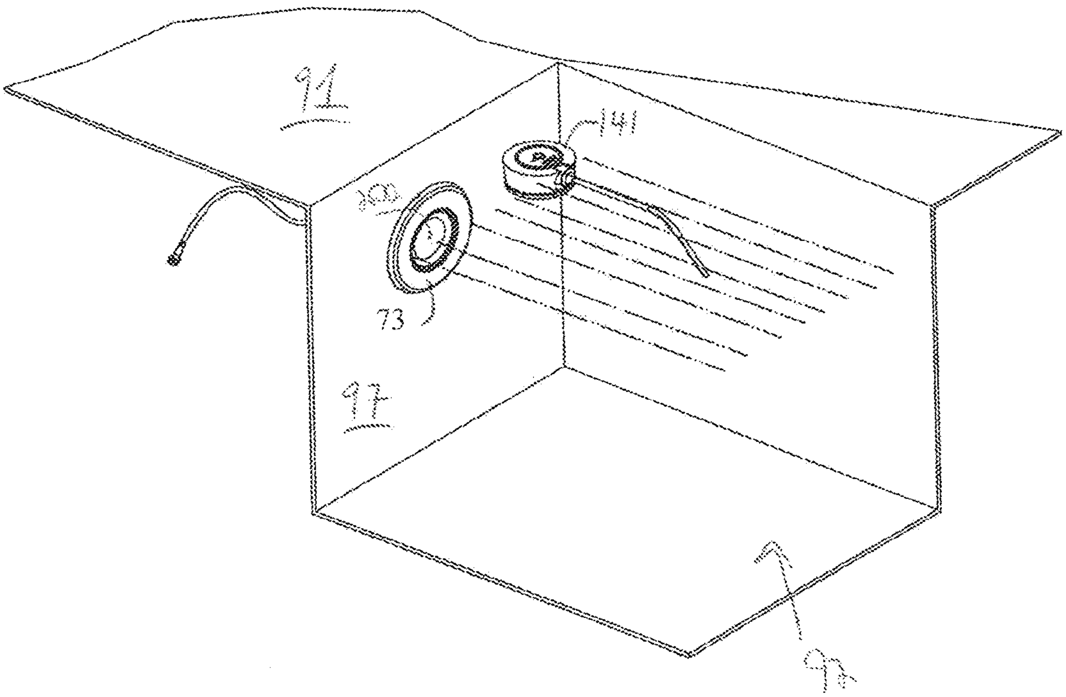
FIG. 20 depicts a floating Rx according to an embodiment of the invention

FIG. 20 illustrates examples of in-wall Tx 129 installed in a wall of the pool. In the upper part of FIG. 18 the in-wall Tx 129 is not connected to a Tx module-and Tx wall gasket 73 and the Tx module 200 are shown. FIG. 20 also illustrates the Rx 100 as including an added-on floating medium to form floating unit 141 that may be fed, via a cable and to connect/be attached to the in-wall Tx 200. The float is an add-on option for end users who—when releasing the Rx connection from the Tx—might loose hold of the Rx who will in turn sink to the bottom of the pool. The float will keep the Rx afloat to ease getting hold of it. The floating medium is configured from encapsulated polystyrene foam, a sealed air compartment or a combination of both. The added on float serves as an additional bumper impact shock absorber for the RX assembly.

Figure 21:
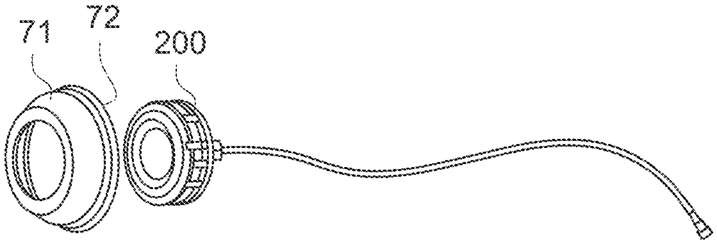
FIG. 21 illustrates an Rx for an on-wall according to an embodiment of the invention.

FIG. 21 illustrates an example of a cable that is connected to Tx module 200 that is turn is followed by Tx flexible on wall gasket 72 and Tx thick On-wall gasket 71. This option is proposed for an On-wall embodiment, whereby the Tx is configured to be installed using an existing, pre-dug tunnel or conduit that is—or was—used for other pool installations or utilities such as, for example, a water return jet conduit from main pool pump or as a submerged wall mounted spotlight and the like. The Tx is embedded and replaces these installations instead and its cable 400 is attached to a power supply located in the pool pump engine room or near a mains power supply outlet.

Figure 22:
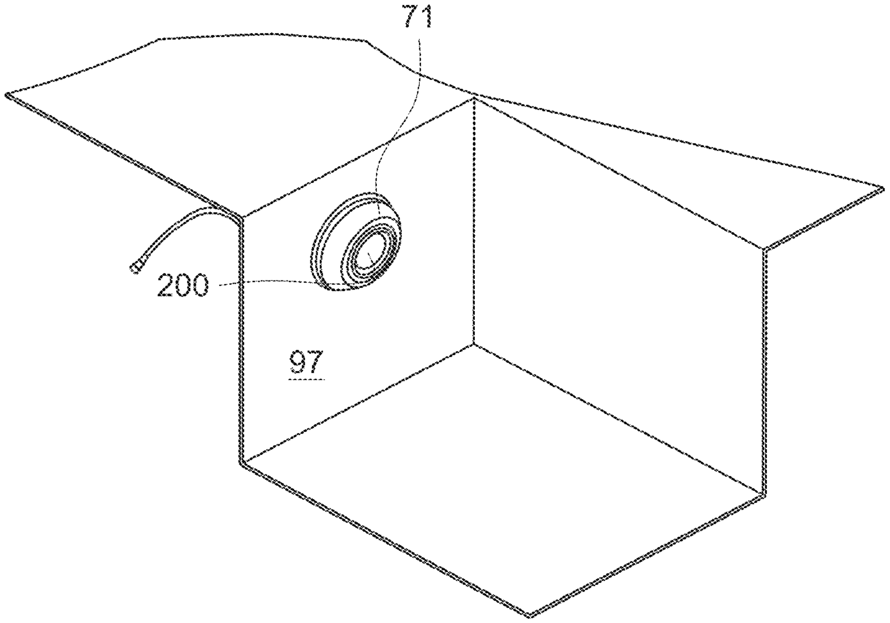
FIG. 22 illustrates a Tx for an on-wall according to an embodiment of the invention.

FIG. 22 illustrates an On-wall (wall 97 of the pool) installed Tx module 200, and Tx thick On-wall gasket 71.

output connector 161 also feeds a wire connector 165 for bi-directional wired communication with microcontroller 169. The microcontroller 169 is configured to communicate (bi-directionally) with WiFi module 163 and with Rx data transceiver 168.

The EMI filter 152 also has an output in communication with an input of DC/DC Low DropOut (LDO) regulator 166 that feeds the microcontroller 169. A current sensor 167 that senses a current from the power amplifier 163 provides measurement signals to the microcontroller 169. The microcontroller 169 also controls a man machine interface such as RGB LEDs 148'.

The following table illustrates examples of status indications communicated by the RGB LEDs:

| System state | Robot state | PWS LED | TX LED | Robot LED | Comment |
|---|---|---|---|---|---|
| Off | Robot not working | Off | Off | Off | No power output from PWS to TX<br>Short press on the PWS shall move the state to On |
| Stand by | Robot waits for operation | On - Blue blinking | On - Blue blinking | Off | RX connecting shall move the system state to On<br>How does the PWS enter this mode?<br>After cycle ends |
| On | Robot working | On - Blue | On - Blue | Blinking blue | User can change the robot LED indication |
| Fault | Robot stop working | Red | Red | Red | Constant RED = robot has fault<br>Blinking RED = IPC has fault (different between RX and TX fault) |
| Hold (Weekly) | Robot waits for operation | Green blinking | Green - blinking | Off | Next state shall be: On |
| PAM | Waiting for power/ robot working | On - Blue | On - Blue | Blinking blue | Next state shall be: On<br>If robot isn't connected jump to Standby |
| Program | Program | RGB | RGB | | During software upgrade |

Figure 23:
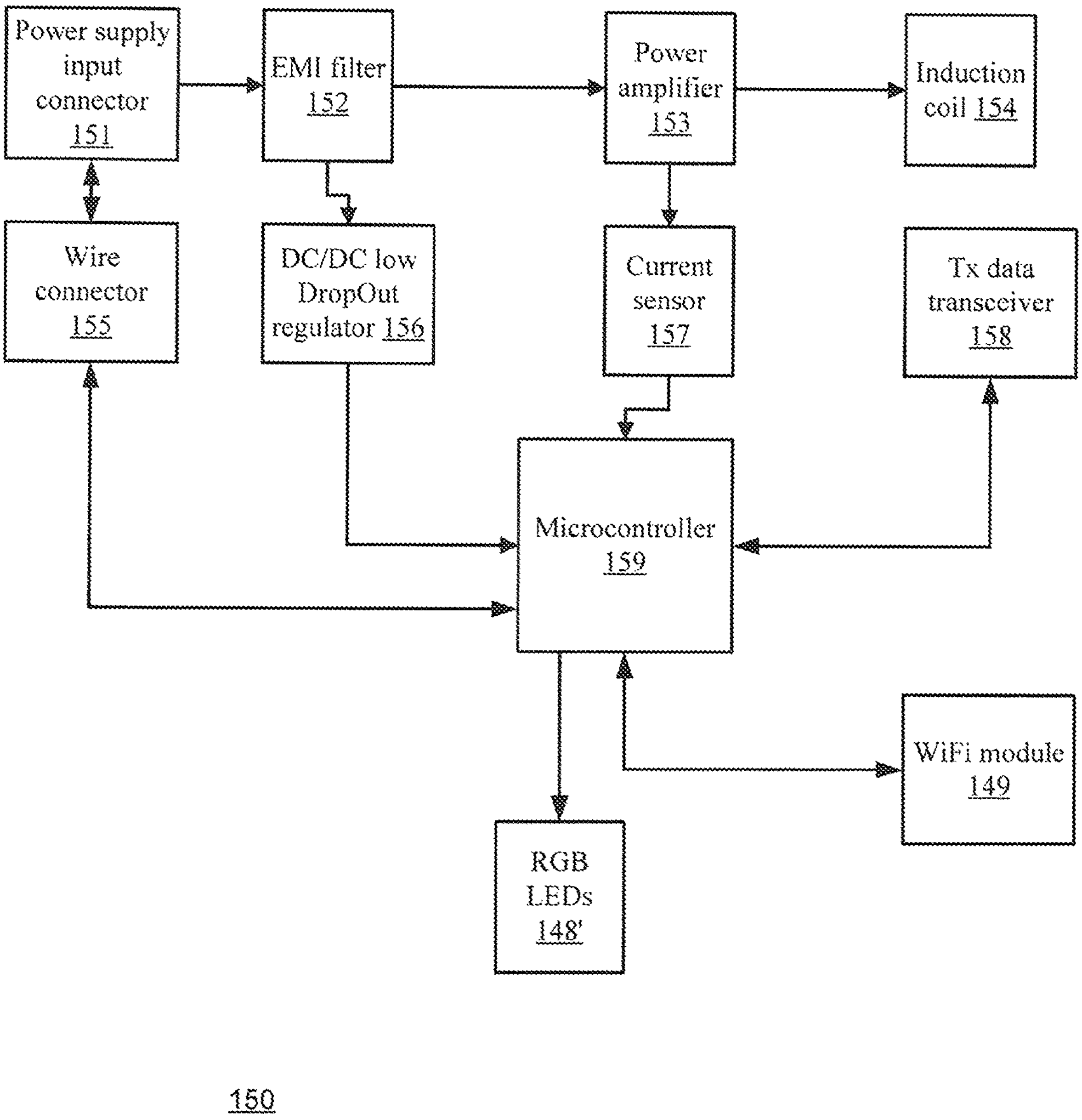
FIG. 23 is an example of a block diagram of the IPC-TX unit.

FIG. 23 is an example of Tx communication unit 150 that includes a power supply input connector 151 that feeds EMI filter 152 having its output in communication with an input of power amplifier 153, and an induction coil 154 that is fed by the power amplifier 153. The power supply input connector 151 also feeds a wire connector 155 for bi-directional wired communication with microcontroller 169. The microcontroller 169 is configured to communicate (bi-directionally) with WiFi module 149 and with Tx data transceiver 158.

The EMI filter 152 also has an output in communication with an input of DC/DC Low DropOut (LDO) regulator 156 that feeds the microcontroller 159. A current sensor 157 that senses a current from the power amplifier 153 provides measurement signals to the microcontroller 159. The microcontroller 159 also controls a man machine interface such as RGB LEDs 148'.

Figure 24:
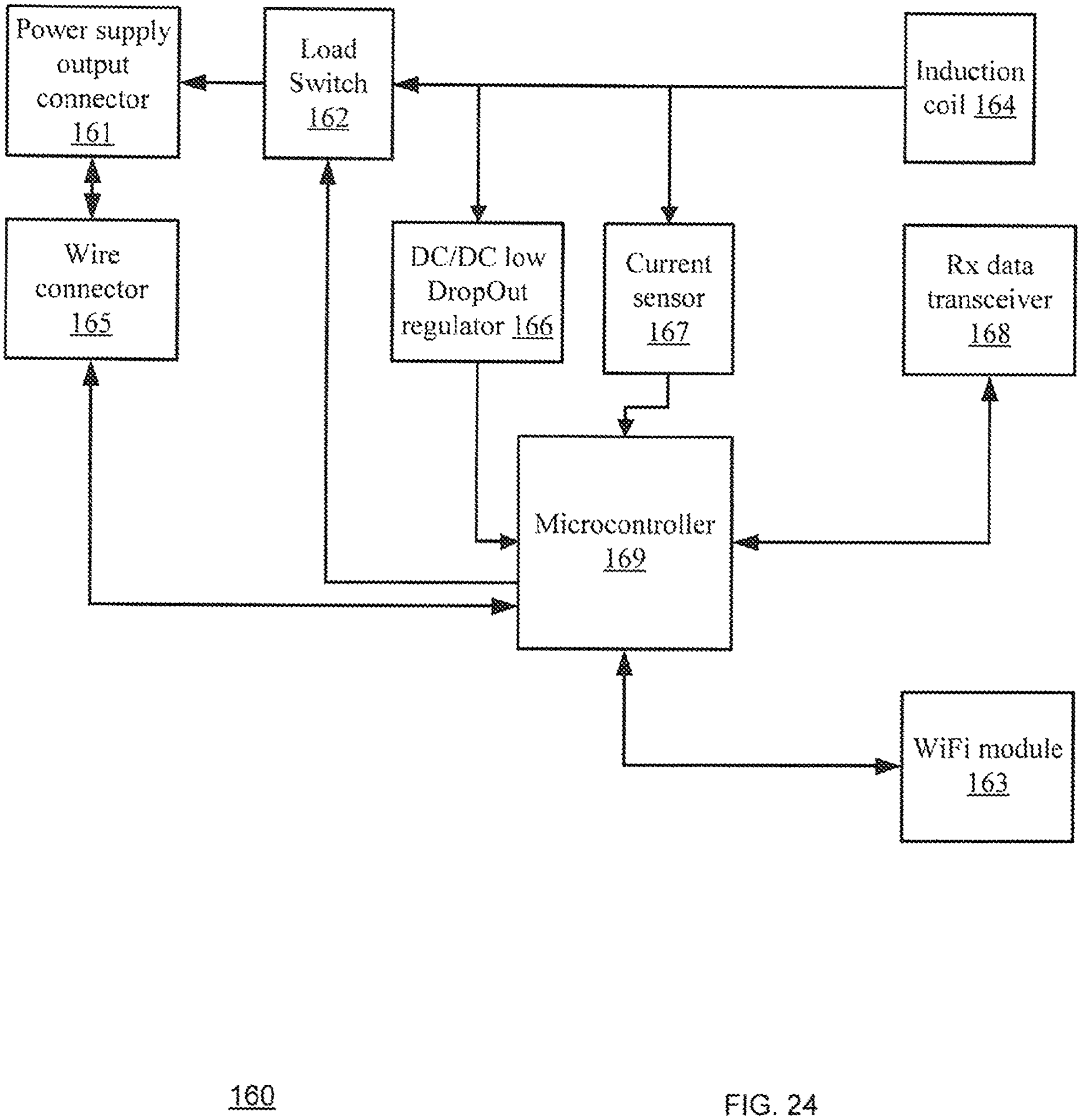
FIG. 24 is an example of a block diagram of the IPC-RX unit.

FIG. 24 is an example of IPC Rx communication unit 160 that includes an induction coil 164 that is configured to feed a current sensor 167, a DC/DC Low DropOut (LDO) regulator 166 (that feeds the microcontroller 169), and a load switch 162 (controlled by the microcontroller 69) that feeds power supply output connector 161. The power supply In case of a system fault, it is important to indicate to the end user if the fault is on the Tx or on the Rx side because the Rx side can be easily analyzed or sent for servicing. Servicing the Tx may require servicing an in-situ at the pool; LED indications may be used to report to the end user the location of the fault as illustrated at the table above.

Safety mechanism for swimming pools: low voltage/power, pairing and low voltage under 30V DC input In order to comply with pool safety regulations, this mechanism comprises Rx nearness recognition or presence to the Tx module. It enables operating at low voltage supply if the Rx module is not near the Tx.

The mode of operation may include:

a. Before an end-user attaches the detached, moveable and releasable Rx module unit onto a wall mounted Tx, the Tx makes a second check to see if a Rx is anywhere near.
b. In a first embodiment, the Tx searches for an energy pulse and if the Rx was attached to the Tx this would be sufficient to cause the Rx to “wake-up” and to communicate back to the Tx that the Rx is attached in system. This is followed by a constant and continual electrical energy flow from the Tx to the Rx.

c. In the preferred embodiment, the Tx-for a second time-charges capacitors to 12 volts. After the capacitors are fully charged this enables the energy stored in the capacitors to be released towards the Tx coil winding module (or sub- module) in a manner that creates an oscillation. This oscillation is measured by means of a controller in the Tx module. If the oscillation is reduced this in a slow manner, then the interpretation will be that an Rx is not attached onto the Tx. If the oscillation is reduced in a fast manner, then the interpretation will be that an Rx is attached onto the Tx.

d. After the Tx has identified the presence of the Rx it will be an indication that the end-user confirms that there are no swimmers in the pool and that end-user wishes that the pool cleaning robot will start a cleaning cycle. This will cause a rise in voltage supply to high or full capacity (=/<30 VDC).

Figure 25:
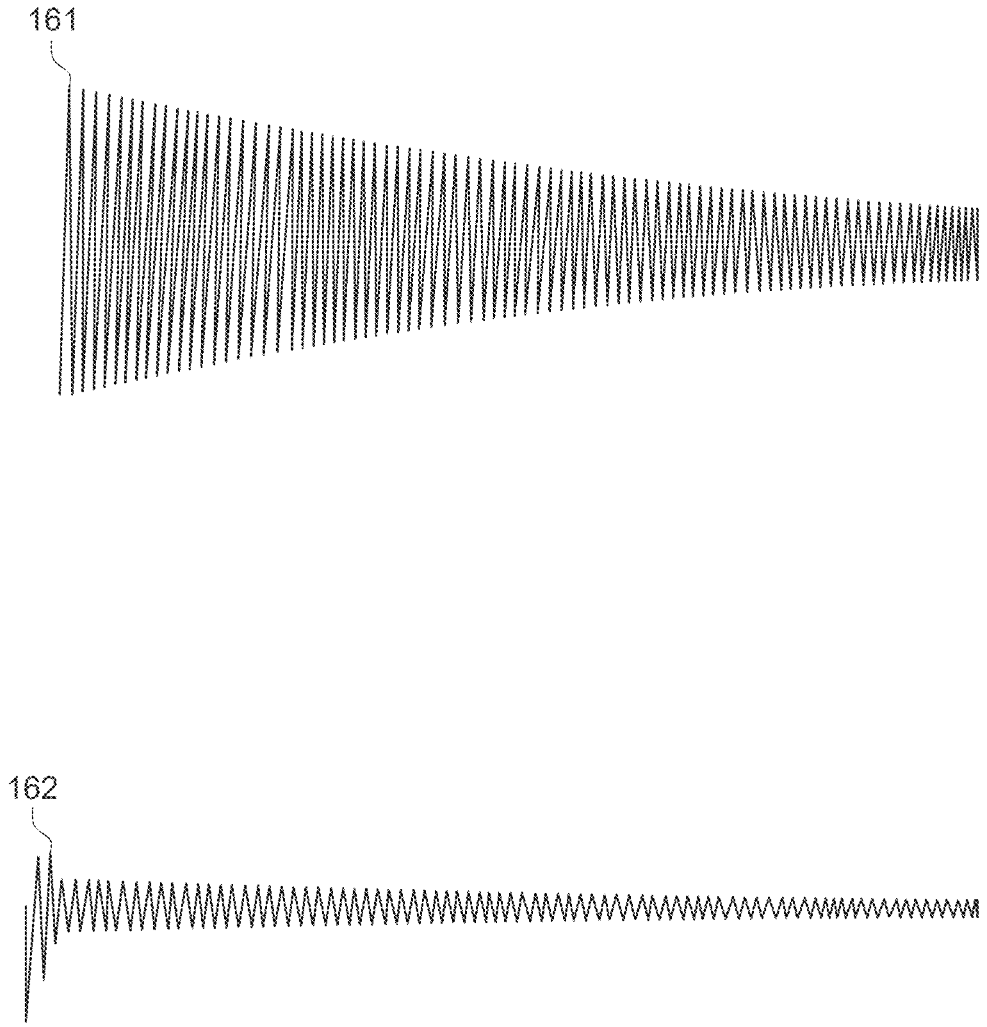
FIG. 25 illustrates waveforms obtained at different distances between the RX and TX elements.

FIG. 25 are examples of the differences between a Tx oscillation without presence of a Rx (image 162) and with the presence of an Rx (image 161).

Figure 26:
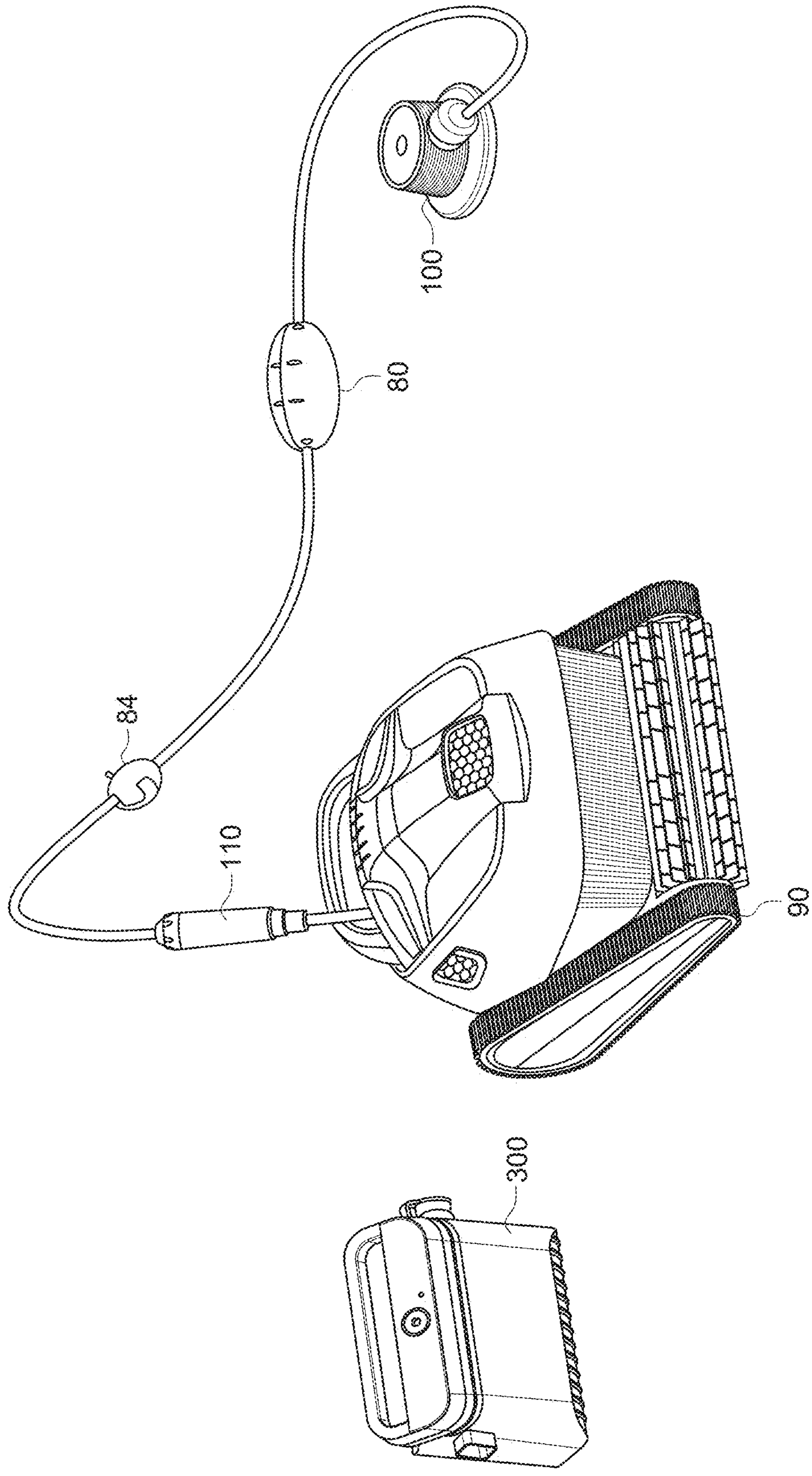
FIG. 26 depicts a PCR, tethered electrical cable wiring with Rx.

In FIG. 26 the PCR 90 connected to a cable 6 that has a mounted-on cable swivel 110 supported by a swivel float 89 and a cable float 80 and the Rx module 100.

It should be noted for perspective that Rx 100 may have a size of about 15 cm across/diameter. The Tx may have sizes of up to 35 cm across or diameter. Smaller or larger sizes may be available according to the inductive power necessities to power larger PCR.

There may be provided a pool related platform. There may be provided a wireless power transfer interface module. The pool related platform may include one or more power consuming elements (for example-pump motor, drive motor, one or more sensors, electrical circuits, controllers, processors, communication units, and the like) and a wireless power transfer interface module that includes a ferromagnetic element that is located within a housing, the housing may include parts such as a first housing part and a second housing part, the second housing part is secured to the first housing part.

The PRP may be any platform that may perform an operation related to a fluid of a pool—cleaning, changing chemical composition, monitoring, and the like. Examples of a PRP include a pool robot that differs from a PCR, a PCR, a floating unit, a skimmer, and the like. Any example related a PCR may be applied mutatis mutandis, to any other PRP.

The wireless power transfer interface module may be included in a PRP, in a pool wall, in a pool bottom, in a floor near the pool, and the like.

A wireless power transfer interface module may include adaptors for attaching and/or anchoring the wireless power transfer interface module to its surroundings.

A wireless power transfer requires a receiving wireless power transfer interface module and a transmitting wireless power transfer interface module. The roles of the receiving wireless power transfer interface module and the transmitting wireless power transfer interface module may change over time.

The power transfer interface module is configured to participate in a power transfer with another wireless power transfer interface module. The power transfer may be done for charging and/or powering and/or communicating.

The wireless power transfer interface module may be a stand alone wireless power transfer interface module that may be installed in a wall, in the floor—or may be a part of a device (such as PRP)—and may perform a power transfer with another wireless power transfer interface module.

The other wireless power transfer interface module may differ from a stand-alone wireless power transfer interface module or may belong to another device.

The ferromagnetic element may be ferromagnetic plate—of may have another shape.

The wireless power transfer interface module is configured to participate in the power transfer only when one or more safety conditions are fulfilled. The one or more safety conditions may be fulfilled when a distance between the wireless power transfer interface module and the other wireless power transfer interface module are below a distance threshold (for example 0.1 till 3 centimeters—or more).

At least one parameter of the power transfer is responsive to one or more safety conditions. A parameter of the at least one parameter may be power, energy, current and a voltage.

The wireless power transfer interface module may be configured to participate in the power transfer after receiving, from the other wireless power transfer interface module, a predefined signal.

At least FIGS. 1, 2, 4, 5, 8, 9 and 17 provide detailed examples of wireless power transfer interface modules. Examples of wireless power transfer interface modules and floor or pool wall installations are illustrated in FIGS. 11, 12, 18 and 22. An example of a wireless power transfer interface module and a floating unit is provided in FIG. 20.

Referring to FIG. 1—the housing parts are Rx body 3 and Rx front cover 10. Referring to FIG. 4—the housing parts are Tx top/front cover 22 and the Tx back/bottom cover 28. Referring to FIG. 8—the housing parts are Adapter for Tx niche 42, and the Base for Tx niche 44. Referring to FIG. 17—the housing parts are Tx wall gasket 73 and the Base for Tx niche 44.

FIGS. 1, 2, 8, 9 and 17 illustrates examples of other components of the wireless power transfer interface module—such as (i) seals, (ii) a magnetic attachment unit (such as magnets holder) configured to magnetically attach the wireless power transfer interface to another wireless power transfer interface module at least during a power transfer period, the magnetic attachment unit is positioned between the seal and the ferromagnetic element (such as ferrite 53), (iii) a bumper that is mechanically coupled to the second housing part, a top cover that is mechanically coupled to the bumper, (iv) an electronic module (for example Rx electronics module 5 and/or Tx electronics module 30) that is located within the housing and includes the ferromagnetic element, an antenna, coil windings, a heat sink and a printed circuit board (for example—Antenna PCB 51, Coil winding 52, Ferrite 53, Rx heat sink 54 and Rx PCB 55, thermal pad for Tx 53, Tx heat sink 34, Aluminum heat sink for Tx 35, and Tx PCB 36).

The coil windings may be glued to the ferromagnetic element.

The antenna may belongs to a communication unit that is configured to exchange information over multiple channels with another communication unit.

The wireless power transfer interface module electromagnetic shielding elements—such as EMI filters and/or brass tubes, and the like.

There is further provided that the assemblies, specifically the said RX and TX (FIGS. 1 and 4) in this specification may be relatively miniaturized and so their sub-components in the sense that they may be produced with smaller sizes. As stated above, if the power requirements are low or lower then the inductive coil can be smaller and more economical. The purpose of such downsizing is that the TX and the RX may be configured to be arranged to fit into a rechargeable battery for a pool related platform to power, for example, a pool cleaning robot with an on board removable and detachable battery (not shown).

The said detachable battery/ies may include a TX assembly to transfer or transmit stored power and data from the battery to an RX assembly that contacts the said TX to transfer the power and/or data to a central control such as an electronic PCB control center that may be located in the pool related platform, that may also comprise motors within a waterproof unit.

The said control center may transmit data from a RX to the battery assembly that for this purpose of data transfer acts as a TX assembly.

The said relative miniaturization of the TX and/or the RX (from said sizes of 15/35 cm across or diameters) may be suited to fit into even smaller (in size) electronic add-on utilities such as sensors. The sizes of such sensors, that may be square, round or oval, can start at ~1 cm up to ~7.5 cm. Numerous sensors exist in the art but in this specification the meaning is the mechanism of attaching and being able to detach or remove a sensor from the surface of a pool related platform.

The TX and or RX of the said sensor are contacted and a two way-data, back and forth, so that wireless data and power transfers may occur.

For example, an added-on optical device, may receive at its RX instructions (commands) from an on-board TX to be activated, using the power it receives, in order to take photos or videos of its surroundings. The said data may be sent back from the TX back to the RX for storage and further processing.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms “front”, “back”, “top”, “bottom”, “over”, “under” and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively “associated” such that the desired functionality is achieved. Hence, any two components herein combined to achieve a particular functionality can be seen as “associated with” each other such that the desired functionality is achieved, irrespective of architectures or intermedial components. Likewise, any two components so associated can also be viewed as being “operably connected” or “operably coupled” to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as ‘computer systems’.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word ‘comprising’ does not exclude the presence of other elements or steps then those listed in a claim. Furthermore, the terms “a” or “an”, as used herein, are defined as one or more than one. Also, the use of introductory phrases such as “at least one” and “one or more” in the claims should not be construed to imply that the introduction of another claim element by the indefinite articles “a” or “an” limits any particular claim containing such introduced claim element to inventions containing only one such element, even when the same claim includes the introductory phrases “one or more” or “at least one” and indefinite articles such as “a” or “an.” The same holds true for the use of definite articles. Unless stated otherwise, terms such as “first” and “second” are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

Any system, apparatus or device referred to this patent application includes at least one hardware component.

Any reference to “comprising” should be applied mutatis mutandis to “consisting” and/or to “consisting essentially of”.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A pool related platform that comprises:

one or more power consuming elements; and a wireless power transfer interface module that comprises:
a body;
a body bumper for impact protecting the body;
a nut bumper for impact protecting a cable that is electrically coupled to an electronics module that is located within an inner space defined by the body; and
a ferromagnetic element that is located within the electronics module.

2. The pool related platform according to claim 1, comprises a seal for sealing the wireless power transfer interface.

3. The pool related platform according to claim 2, comprising a magnetic attachment unit configured to magnetically attach the wireless power transfer interface module to another wireless power transfer interface module at least during a power transfer period.

4. The pool related platform according to claim 3, wherein the magnetic attachment unit is positioned between the seal and the ferromagnetic element.

5. The pool related platform according to claim 2, wherein the nut bumper is oriented to the body bumper.

6. The pool related platform according to claim 5, comprising a top cover that is mechanically coupled to the body bumper.

7. The pool related platform according to claim 1, wherein the electronics module further comprises an antenna, coil windings, a heat sink and a reception printed circuit board.

8. The pool related platform according to claim 7 wherein the coil windings are glued to the ferromagnetic element.

9. The pool related platform according to claim 7 wherein the antenna belongs to a communication unit that is configured to exchange information over multiple channels with another communication unit that does not belong to the pool related platform.

10. The pool related platform according to claim 9 wherein the other communication unit belongs to a device that comprises another wireless power transfer interface module.

11. The pool related platform according to claim 1, wherein the ferromagnetic element is a ferromagnetic plate.

12. The pool related platform according to claim 1, comprising a wireless communication unit configured to communicate at megahertz fequencies, wherein the wireless power transfer interface is configured to receive wireless power conveying signals that alternate at a frequency of one or two hundreds of kilohertz.

13. The pool related platform according to claim 1 wherein the wireless power transfer interface module is configured to participate in a power transfer with another wireless power transfer interface module that does not belong to the pool related platform.

14. The pool related platform according to claim 13 wherein the wireless power transfer interface module is configured to participate in the power transfer only when one or more safety conditions are fulfilled.

15. The pool related platform according to claim 14 wherein one of the one or more safety conditions are fulfilled when a distance between the wireless power transfer interface module and the other wireless power transfer interface module is below a distance threshold.

16. The pool related platform according to claim 13 wherein at least one parameter of the power transfer is responsive to one or more safety conditions.

17. The pool related platform according to claim 16 wherein a parameter of the at least one parameter is a voltage.

18. The pool related platform according to claim 16 wherein the wireless power transfer interface module is configured to participate in the power transfer after receiving, from the other wireless power transfer interface module, a predefined signal.

19. The pool related platform according to claim 1 wherein the pool related platform is a robot or a floating unit.

20. A wireless power transfer interface module that comprises:
a body:
a body bumper for impact protecting the body;
a nut bumper for impact protecting a cable that is electrically coupled to an electronics module that is located within an inner space defined by the body; and
a ferromagnetic element that is located within the electronics module.

* * * * *